United States Patent
Guo et al.

(10) Patent No.: US 11,996,944 B2
(45) Date of Patent: May 28, 2024

(54) COMMUNICATION METHOD AND APPARATUS FOR COMMUNICATION OF A CONTROL CHANNEL AND DATA CHANNEL

(71) Applicant: Huawei Technologies Co., Ltd., Shenzhen (CN)

(72) Inventors: Wenting Guo, Shanghai (CN); Jinfang Zhang, Shenzhen (CN); Lei Lu, Shanghai (CN); Zhengzheng Xiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 17/514,964

(22) Filed: Oct. 29, 2021

(65) Prior Publication Data
US 2022/0052789 A1 Feb. 17, 2022

Related U.S. Application Data

(63) Continuation of application No. PCT/CN2020/084715, filed on Apr. 14, 2020.

(30) Foreign Application Priority Data

Apr. 30, 2019 (CN) .......................... 201910364529.4

(51) Int. Cl.
*H04L 1/1607* (2023.01)
*H04L 5/00* (2006.01)
(Continued)

(52) U.S. Cl.
CPC .......... *H04L 1/1642* (2013.01); *H04L 5/0051* (2013.01); *H04W 72/0446* (2013.01); *H04W 72/0453* (2013.01); *H04W 72/20* (2023.01)

(58) Field of Classification Search
CPC ................. H04L 1/1642; H04L 5/0051; H04L 27/26136; H04L 1/0041; H04L 1/0072;
(Continued)

(56) References Cited

U.S. PATENT DOCUMENTS

2014/0269519 A1  9/2014  Shan et al.
2014/0341180 A1* 11/2014  Liu ....................... H04L 5/0048
370/330

(Continued)

FOREIGN PATENT DOCUMENTS

CN  106993260 A  7/2017
CN  107736064 A  2/2018
(Continued)

OTHER PUBLICATIONS

"Design and contents of PSCCH and PSFCH," 3GPP TSG RAN WG1 Meeting #96bis, Xi'an, China, R1-1904689, Total 9 pages, XP051707282, 3rd Generation Partnership Project, Valbonne, France (Apr. 8-12, 2019). (Year: 2019).*

(Continued)

*Primary Examiner* — Thinh D Tran
(74) *Attorney, Agent, or Firm* — Leydig, Voit & Mayer, Ltd.

(57) ABSTRACT

This application provides a communication method and apparatus used for the internet of vehicles, for example, vehicle to everything (V2X), Long Term Evolution-Vehicle (LTE-V), and vehicle-to-vehicle communication (V2V). The method includes: a first terminal apparatus generates, based on indication information such as an aggregation level of a control channel or a demodulation reference sequence configuration of a data channel, a demodulation reference sequence of another control channel, and sends the demodulation reference sequence to a second terminal apparatus. The second terminal apparatus can obtain the indication (Continued)

information in a process of detecting the demodulation reference sequence of the other control channel, to demodulate the control channel or the data channel.

20 Claims, 11 Drawing Sheets

(51) Int. Cl.
*H04W 72/0446* (2023.01)
*H04W 72/0453* (2023.01)
*H04W 72/20* (2023.01)

(58) Field of Classification Search
CPC .......... H04L 5/0053; H04L 2001/0093; H04L 1/0006; H04L 5/001; H04L 5/0048; H04W 72/0446; H04W 72/0453; H04W 72/20
See application file for complete search history.

(56) References Cited

U.S. PATENT DOCUMENTS

| | | | |
|---|---|---|---|
| 2018/0176059 A1* | 6/2018 | Medles | H04W 72/54 |
| 2021/0258925 A1* | 8/2021 | Wang | H04W 52/0235 |

FOREIGN PATENT DOCUMENTS

| | | |
|---|---|---|
| CN | 108631986 A | 10/2018 |
| CN | 109150387 A | 1/2019 |
| CN | 109150460 A | 1/2019 |
| CN | 109150472 A | 1/2019 |
| CN | 109392180 A | 2/2019 |
| EP | 2639994 A2 | 9/2013 |
| JP | 2014112944 A | 6/2014 |

OTHER PUBLICATIONS

"Feature lead summary of low PAPR RS", 3GPP TSG RAN WG1 Meeting RAN1#96bis, Xian, China, R1-1905668, Apr. 8-12, 2019 (Year: 2019).*
"Sidelink physical layer structure for NR V2X," 3GPP TSG RAN WG1 Meeting #96bis, Xi'an, China, R1-1903943, Total 17 pages, XP051707058, 3rd Generation Partnership Project, Valbonne, France (Apr. 8-12, 2019).
"Design and contents of PSCCH and PSFCH," 3GPP TSG RAN WG1 Meeting #96bis, Xi'an, China, R1-1904689, Total 9 pages, XP051707282, 3rd Generation Partnership Project, Valbonne, France (Apr. 8-12, 2019).

* cited by examiner

COMMUNICATION METHOD AND APPARATUS FOR COMMUNICATION OF A CONTROL CHANNEL AND DATA CHANNEL

CROSS-REFERENCE TO RELATED APPLICATIONS

This application is a continuation of International Application No. PCT/CN2020/084715, filed on Apr. 14, 2020, which claims priority to Chinese Patent Application No. 201910364529.4, filed on Apr. 30, 2019. The disclosures of the aforementioned applications are hereby incorporated by reference in their entireties.

TECHNICAL FIELD

This application relates to the communication field, and in particular, to a communication method and apparatus.

BACKGROUND

In an existing wireless communication system, a sender usually uses an orthogonal sequence with a good correlation as a demodulation reference sequence for a control channel and a data channel, so that a receiver quickly demodulates the control channel and the data channel. For example, in a vehicle to anything (V2X) communication system based on a long term evolution (LTE) technology, a ZC sequence (Zadoff-Chu sequence) is used as a demodulation reference sequence for a sidelink (SL). For another example, in a 5th generation (5G) mobile communication system, for example, a new radio (NR) system, a pseudo-random sequence (PRS) is used as a demodulation reference sequence for an uplink&downlink (UL&DL, also referred to as a Uu link). Indication information of the control channel and the data channel, such as an aggregation level of the control channel and a demodulation reference sequence configuration of the data channel, may be explicitly sent by the sender to the receiver through signaling.

However, with rapid development of a V2X technology, a size of the V2X communication system will increase exponentially. To ensure communication quality, resources that can be distinguished from each other, such as a time domain resource, a frequency domain resource, a code domain resource, and a space domain resource, may need to be configured for different participants. Correspondingly, a quantity of pieces of the foregoing indication information also increases greatly, and consequently a large quantity of resources are occupied, severely affecting V2X data communication efficiency.

SUMMARY

Embodiments of this application provide a communication method and apparatus, to implicitly transmit indication information of a control channel or a data channel, so that a quantity of pieces of indication information that needs to be transmitted and a quantity of resources occupied by the indication information can be reduced, thereby improving communication efficiency.

According to a first aspect, a communication method is provided. The communication method includes: A first terminal apparatus generates a first demodulation reference sequence based on an aggregation level of a second control channel. The first demodulation reference sequence is used to demodulate a first control channel, a first demodulation reference signal generated based on the first demodulation reference sequence is mapped to the first control channel, and first control information carried on the first control channel and second control information carried on the second control channel are used to demodulate a data channel. Then, the first terminal apparatus sends the first control channel, the second control channel, and the data channel to a second terminal apparatus in a first slot.

According to the communication method provided in the first aspect, the first terminal apparatus can generate, based on the aggregation level of the second control channel, the first demodulation reference sequence used to demodulate the first control channel, that is, can implicitly transmit the aggregation level of the second control channel. When detecting the first demodulation reference sequence, the second terminal apparatus can simultaneously learn of the aggregation level of the second control channel. The first terminal apparatus does not need to separately send indication information such as the aggregation level of the second control channel to the second terminal apparatus. In this way, a quantity of pieces of indication information that needs to be transmitted and a quantity of resources occupied by the indication information can be reduced, thereby improving communication efficiency.

In a possible design method, that a first terminal apparatus generates a first demodulation reference sequence based on an aggregation level of a second control channel may include: The first terminal apparatus determines an initial value of the first demodulation reference sequence based on the aggregation level of the second control channel. Then, the first terminal apparatus generates the first demodulation reference sequence based on the initial value of the first demodulation reference sequence.

Optionally, that the first terminal apparatus determines an initial value of the first demodulation reference sequence based on the aggregation level of the second control channel includes: The first terminal apparatus determines the initial value of the first demodulation reference sequence based on the aggregation level of the second control channel, a quantity of symbols included in the first slot, a slot number of the first slot, and a symbol number of a symbol that carries the first demodulation reference sequence and that is in the first slot.

For example, the aggregation level of the second control channel is in a one-to-one correspondence with an index value of the aggregation level of the second control channel.

Optionally, that the first terminal apparatus determines the initial value of the first demodulation reference sequence based on the aggregation level of the second control channel, a quantity of symbols included in the first slot, a slot number of the first slot, and a symbol number of a symbol that carries the first demodulation reference sequence and that is in the first slot may include: The first terminal apparatus determines that the initial value of the first demodulation reference sequence satisfies: $c_{init} = (2^{17}(N_{symb}^{slot} n_{s,f}^{m} + l + 1) + k) \bmod (2^{31})$, where $c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, k is the aggregation level of the second control channel, and an operator mod represents a modulo operation.

Optionally, that the first terminal apparatus determines the initial value of the first demodulation reference sequence based on the aggregation level of the second control channel, a quantity of symbols included in the first slot, a slot number of the first slot, and a symbol number of a symbol that carries the first demodulation reference sequence and that is in the first slot may include: The first terminal apparatus determines that the initial value of the first demodulation reference sequence satisfies: $c_{init}=(2^{17}(N_{symb}^{slot}n_{s,f}^{m}+l+1)+i)\mod(2^{31})$, where $c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, i is the index value of the aggregation level of the second control channel, and an operator mod represents a modulo operation.

According to a second aspect, a communication method is provided. The communication method includes: A first terminal apparatus generates a second demodulation reference sequence based on an aggregation level of a third control channel, where the second demodulation reference sequence is used to demodulate the third control channel, a second demodulation reference signal generated based on the second demodulation reference sequence is mapped to the third control channel, and third control information carried on the third control channel is used to demodulate a data channel. Then, the first terminal apparatus sends the third control channel and the data channel to a second terminal apparatus in a first slot.

According to the communication method provided in the second aspect, the first terminal apparatus can generate, based on the aggregation level of the third control channel, the second demodulation reference sequence used to demodulate the third control channel, that is, can implicitly transmit the aggregation level of the third control channel. When detecting the second demodulation reference sequence, the second terminal apparatus can simultaneously learn of the aggregation level of the third control channel. The first terminal apparatus does not need to separately send indication information such as the aggregation level of the third control channel to the second terminal apparatus. In this way, a quantity of pieces of indication information that needs to be transmitted and a quantity of resources occupied by the indication information can be reduced, thereby improving communication efficiency.

In a possible design method, that a first terminal apparatus generates a second demodulation reference sequence based on an aggregation level of a third control channel may include: The first terminal apparatus determines an initial value of the second demodulation reference sequence based on the aggregation level of the third control channel. The first terminal apparatus generates the second demodulation reference sequence based on the initial value of the second demodulation reference sequence.

Optionally, that the first terminal apparatus determines an initial value of the second demodulation reference sequence based on the aggregation level of the third control channel may include: The first terminal apparatus determines the initial value of the second demodulation reference sequence based on the aggregation level of the third control channel, a quantity of symbols included in the first slot, a slot number of the first slot, and a symbol number of a symbol that carries the second demodulation reference sequence and that is in the first slot.

For example, the aggregation level of the third control channel is in a one-to-one correspondence with an index value of the aggregation level of the third control channel.

Optionally, that the first terminal apparatus determines the initial value of the second demodulation reference sequence based on the aggregation level of the third control channel, a quantity of symbols included in the first slot, a slot number of the first slot, and a symbol number of a symbol that carries the second demodulation reference sequence and that is in the first slot may include: The first terminal apparatus determines that the initial value of the second demodulation reference sequence satisfies: $c_{init}=(2^{17}(N_{symb}^{slot}n_{s,f}^{m}+l+1)+k)\mod(2^{31})$, where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, k is the aggregation level of the third control channel, and an operator mod represents a modulo operation.

Optionally, that the first terminal apparatus determines the initial value of the second demodulation reference sequence based on the aggregation level of the third control channel, a quantity of symbols included in the first slot, a slot number of the first slot, and a symbol number of a symbol that carries the second demodulation reference sequence and that is in the first slot may include: The first terminal apparatus determines that the initial value of the second demodulation reference sequence satisfies: $c_{init}=(2^{17}(N_{symb}^{slot}n_{s,f}^{m}+l+1)+i)\mod(2^{31})$, where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, i is the index value of the aggregation level of the third control channel, and an operator mod represents a modulo operation.

It should be noted that, in addition to the aggregation level of the third control channel, the second demodulation reference sequence may further implicitly indicate another parameter, for example, a control information format. Therefore, optionally, the first terminal apparatus may alternatively calculate the initial value of the second demodulation reference sequence based on an index value of the control information format of the third control channel, for example, perform the calculation by substituting the index value of the control information format of the third control channel into the foregoing calculation formula of the initial value of the second demodulation reference sequence, to generate the second demodulation reference sequence and map the second demodulation reference sequence onto the third control channel for sending. In this way, implicit transmission of the control information format of the third control channel is performed. The control information format of the third control channel is in a one-to-one correspondence with the index value of the control information format of the third control channel.

According to a third aspect, a communication method is provided. The communication method includes: A first terminal apparatus generates a third demodulation reference sequence based on a demodulation reference sequence configuration of a data channel, where the third demodulation reference sequence is used to demodulate a fourth control channel, and fourth control information carried on the fourth control channel is used to demodulate the data channel. Then, the first terminal apparatus sends the fourth control channel and the data channel to a second terminal apparatus in a first slot.

According to the communication method provided in the third aspect, the first terminal apparatus can generate, based on the demodulation reference sequence configuration of the data channel, the third demodulation reference sequence used to demodulate the fourth control channel, that is, can implicitly transmit the demodulation reference sequence configuration of the data channel. When detecting the third demodulation reference sequence, the second terminal apparatus can simultaneously learn of the demodulation reference sequence configuration of the data channel. The first terminal apparatus does not need to separately send indication information such as the demodulation reference sequence configuration of the data channel to the second terminal apparatus. In this way, a quantity of pieces of indication information that needs to be transmitted and a quantity of resources occupied by the indication information can be reduced, thereby improving communication efficiency.

In a possible design method, that a first terminal apparatus generates a third demodulation reference sequence based on a demodulation reference sequence configuration of a data channel may include: The first terminal apparatus determines an initial value of the third demodulation reference sequence based on the demodulation reference sequence configuration of the data channel. The first terminal apparatus generates the third demodulation reference sequence based on the initial value of the third demodulation reference sequence.

Optionally, that the first terminal apparatus determines an initial value of the third demodulation reference sequence based on the demodulation reference sequence configuration of the data channel may include: The first terminal apparatus determines the initial value of the third demodulation reference sequence based on the demodulation reference sequence configuration of the data channel, a quantity of symbols included in the first slot, a slot number of the first slot, and a symbol number of a symbol that carries the third demodulation reference sequence and that is in the first slot.

For example, the demodulation reference sequence configuration of the data channel includes any one of the following: a frequency domain pattern, a time domain pattern, or a time-frequency pattern of a demodulation reference sequence of the data channel. The frequency domain pattern of the demodulation reference sequence of the data channel is in a one-to-one correspondence with an index of the frequency domain pattern of the demodulation reference sequence of the data channel. The time domain pattern of the demodulation reference sequence of the data channel is in a one-to-one correspondence with an index of the time domain pattern of the demodulation reference sequence of the data channel. The time-frequency pattern of the demodulation reference sequence of the data channel is in a one-to-one correspondence with an index of the time-frequency pattern of the demodulation reference sequence of the data channel.

Optionally, that the first terminal apparatus determines the initial value of the third demodulation reference sequence based on the demodulation reference sequence configuration of the data channel, a quantity of symbols included in the first slot, a slot number of the first slot, and a symbol number of a symbol that carries the third demodulation reference sequence and that is in the first slot may include: The first terminal apparatus determines that the initial value of the third demodulation reference sequence satisfies: $c_{init}=(2^{17}(N_{symb}^{slot}n_{s,f}^{m}+l+1)+i) \bmod(2^{31})$, where $c_{init}$ is the initial value of the third demodulation reference sequence, $N_{symb}^{slot}$ is the quantity of symbols included in the first slot, $n_{s,f}^{m}$ is the slot number of the first slot, l is the symbol number of the symbol that carries the third demodulation reference sequence and that is in the first slot, i is any one of the index of the frequency domain pattern, the index of the time domain pattern, or the index of the time-frequency pattern of the demodulation reference sequence of the data channel, and an operator mod represents a modulo operation.

According to a fourth aspect, a communication method is provided. The communication method includes: A second terminal apparatus receives a first control channel from a first terminal apparatus in a first slot, and determines an aggregation level of a second control channel based on a first demodulation reference sequence. The first control channel carries a first demodulation reference signal and first control information, and the first demodulation reference sequence for generating the first demodulation reference signal is used to demodulate the first control channel. Then, the second terminal apparatus receives the second control channel from the first terminal apparatus in the first slot based on the aggregation level of the second control channel. The first control information carried on the first control channel and second control information carried on the second control channel are used to demodulate the data channel. Subsequently, the second terminal apparatus receives the data channel from the first terminal apparatus in the first slot based on the first control information and the second control information.

In a possible design method, that a second terminal apparatus determines an aggregation level of a second control channel based on a first demodulation reference sequence may include: The second terminal apparatus determines an initial value of the first demodulation reference sequence. The second terminal apparatus determines the aggregation level of the second control channel based on the initial value of the first demodulation reference sequence.

Optionally, that the second terminal apparatus determines an initial value of the first demodulation reference sequence may include: The second terminal apparatus determines a first candidate initial value set based on a first candidate aggregation level set, and generates a first candidate demodulation reference sequence set based on the first candidate initial value set. The first candidate aggregation level set includes one or more candidate aggregation levels of the second control channel, the first candidate initial value set includes one or more candidate initial values of the first demodulation reference sequence, and the first candidate demodulation reference sequence set includes one or more candidate demodulation reference sequences of the first demodulation reference sequence. Then, the second terminal apparatus performs demodulation and decoding on the first control channel by using each candidate demodulation reference sequence in the first candidate demodulation reference sequence set, determines, as the first demodulation reference sequence, a candidate demodulation reference sequence that is in the first candidate demodulation reference sequence set and that can be used to successfully perform demodulation and decoding on the first control channel to obtain first control information, and determines a candidate initial value corresponding to the first demodulation reference sequence as the initial value of the first demodulation reference sequence.

Optionally, that the second terminal apparatus determines the aggregation level of the second control channel based on the initial value of the first demodulation reference sequence may include: The second terminal apparatus determines the aggregation level of the second control channel based on the initial value of the first demodulation reference sequence, a quantity of symbols included in the first slot, a slot number of the first slot, and a symbol number of a symbol that carries the first demodulation reference sequence and that is in the first slot.

For example, the aggregation level of the second control channel is in a one-to-one correspondence with an index value of the aggregation level of the second control channel.

Optionally, that the second terminal apparatus determines the aggregation level of the second control channel based on the initial value of the first demodulation reference sequence, a quantity of symbols included in the first slot, a slot number of the first slot, and a symbol number of a symbol that carries the first demodulation reference sequence and that is in the first slot may include: The second terminal apparatus determines that the aggregation level of the second control channel satisfies: $c_{init}=(2^{17}(N_{symb}^{slot} n_{s,f}^{m}+l+1)+k) \bmod(2^{31})$, where $c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, k is the aggregation level of the second control channel, and an operator mod represents a modulo operation.

Optionally, that the second terminal apparatus determines the aggregation level of the second control channel based on the initial value of the first demodulation reference sequence, a quantity of symbols included in the first slot, a slot number of the first slot, and a symbol number of a symbol that carries the first demodulation reference sequence and that is in the first slot may include: The second terminal apparatus determines that the index value of the aggregation level of the second control channel satisfies: $c_{init}=(2^{17}(N_{symb}^{slot} n_{s,f}^{m}+l+1)+i) \bmod(2^{31})$, where $c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, i is the index value of the aggregation level of the second control channel, and an operator mod represents a modulo operation.

It should be noted that, for a technical effect of the communication method in the fourth aspect, refer to the technical effect of the communication method in the first aspect. Details are not described herein again.

According to a fifth aspect, a communication method is provided. The communication method includes: A second terminal apparatus receives, from a first terminal apparatus in a first slot, a second demodulation reference signal corresponding to a third control channel; and determines an aggregation level of the third control channel based on a second demodulation reference sequence. The second demodulation reference sequence for generating the second demodulation reference signal is used to demodulate third control information carried on the third control channel, and the third control information is used to demodulate a data channel. Then, the second terminal apparatus receives the third control information from the first terminal apparatus based on the aggregation level of the third control channel. Subsequently, the second terminal apparatus receives the data channel from the first terminal apparatus in the first slot based on the third control information.

In a possible design method, that a second terminal apparatus determines an aggregation level of the third control channel based on a second demodulation reference sequence may include: The second terminal apparatus determines an initial value of the second demodulation reference sequence. The second terminal apparatus determines the aggregation level of the third control channel based on the initial value of the second demodulation reference sequence.

Optionally, that the second terminal apparatus determines an initial value of the second demodulation reference sequence may include: The second terminal apparatus determines a second candidate initial value set based on a second candidate aggregation level set, and generates a second candidate demodulation reference sequence set based on the second candidate initial value set. The second candidate aggregation level set includes one or more candidate aggregation levels of the third control channel, the second candidate initial value set includes one or more candidate initial values of the second demodulation reference sequence, and the second candidate demodulation reference sequence set includes one or more candidate demodulation reference sequences of the second demodulation reference sequence. Then, the second terminal apparatus performs correlation detection on a received signal of the third control channel by using each candidate demodulation reference sequence in the second candidate demodulation reference sequence set, determines a candidate demodulation reference sequence with a largest average correlation value in the second candidate demodulation reference sequence set as the second demodulation reference sequence, and determines a candidate initial value corresponding to the second demodulation reference sequence as the initial value of the second demodulation reference sequence.

In a possible implementation, that the second terminal apparatus performs correlation detection on a received signal of the third control channel by using each candidate demodulation reference sequence in the second candidate demodulation reference sequence set may include: The second terminal apparatus calculates, according to the following formula, an average correlation value corresponding to each candidate demodulation reference sequence in the second candidate demodulation reference sequence set:

$$c = \frac{1}{N}\sum_{n=0}^{N-1} \|h_n * h_{n,k}\|^2,$$

where c is an average correlation value of a first candidate demodulation reference sequence, the first candidate demodulation reference sequence is any candidate demodulation reference sequence in the second candidate demodulation reference sequence set, $h_n$ is the received signal of the third control channel, $h_{n,k}$ is the first candidate demodulation reference sequence, k is a candidate aggregation level corresponding to the first candidate demodulation reference sequence in the second candidate aggregation level set, $h_{n,k}$ is a conjugate complex number of $h_n$, $0 \leq n < N-1$, and N is a sequence length of $h_{n,k}$.

In another possible implementation, that the second terminal apparatus performs correlation detection on a received signal of the third control channel by using each candidate demodulation reference sequence in the second candidate demodulation reference sequence set may include: The second terminal apparatus calculates, according to the following formula, an average correlation value corresponding to each candidate demodulation reference sequence in the second candidate demodulation reference sequence set:

$$c = \frac{1}{N}\sum_{n=0}^{N-1} \|h_n * h_{n,i}\|^2,$$

where c is an average correlation value of a first candidate demodulation reference sequence, the first candidate demodulation reference sequence is any candidate demodulation reference sequence in the second candidate demodulation reference sequence set, $h_n$ is the received signal of the third control channel, $h_{n,i}$ is the first candidate demodulation reference sequence, i is an index value of the candidate aggregation level corresponding to the first candidate demodulation reference sequence in the second candidate aggregation level set, $h_{n,i}$ is a conjugate complex number of $h_n$, 0≤n<N−1, and N is a sequence length of $h_{n,i}$.

Optionally, the average correlation value may include a first average correlation value and a second average correlation value. The first average correlation value is an average correlation value on a first resource scheduling unit, the second average correlation value is an average correlation value on a second resource scheduling unit, and the first resource scheduling unit and the second resource scheduling unit are consecutive in frequency domain. Correspondingly, that the second terminal apparatus determines an initial value of the second demodulation reference sequence may further include: If a ratio of the first average correlation value to the second average correlation value is greater than a first ratio threshold and less than a second ratio threshold, the second terminal apparatus determines that correlation of the first resource scheduling unit is consistent with correlation of the second resource scheduling unit.

Optionally, that the second terminal apparatus determines the aggregation level of the third control channel based on the initial value of the second demodulation reference sequence may include: The second terminal apparatus determines the aggregation level of the third control channel based on the initial value of the second demodulation reference sequence, a quantity of symbols included in the first slot, a slot number of the first slot, and a symbol number of a symbol that carries the second demodulation reference sequence and that is in the first slot.

For example, the aggregation level of the third control channel is in a one-to-one correspondence with an index value of the aggregation level of the third control channel.

Optionally, that the second terminal apparatus determines the aggregation level of the third control channel based on the initial value of the second demodulation reference sequence, a quantity of symbols included in the first slot, a slot number of the first slot, and a symbol number of a symbol that carries the second demodulation reference sequence and that is in the first slot may include: The second terminal apparatus determines that the aggregation level of the third control channel satisfies: $c_{init}=(2^{17}(N_{symb}^{slot}n_{s,f}^{m}+l+1)+k)\mod(2^{31})$, where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, k is the aggregation level of the third control channel, and an operator mod represents a modulo operation.

Optionally, that the second terminal apparatus determines the aggregation level of the third control channel based on the initial value of the second demodulation reference sequence, a quantity of symbols included in the first slot, a slot number of the first slot, and a symbol number of a symbol that carries the second demodulation reference sequence and that is in the first slot may include: The second terminal apparatus determines that the index value of the aggregation level of the third control channel satisfies: $c_{init}=(2^{17}(N_{symb}^{slot}n_{s,f}^{m}+l+1)+i)\mod(2^{31})$, where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, i is the index value of the aggregation level of the third control channel, and an operator mod represents a modulo operation.

It should be noted that, in addition to the aggregation level of the third control channel, the second demodulation reference sequence may be further used to indicate another parameter, for example, a control information format. Different control information formats respectively correspond to different services. Therefore, optionally, the second terminal apparatus may alternatively determine the second demodulation reference sequence and the initial value of the second demodulation reference sequence based on a blind detection result of the demodulation reference sequence, to determine an index value of the control information format of the third control channel corresponding to the second demodulation reference sequence, and further obtain the control information format of the third control channel. In this way, implicit transmission of the control information format of the third control channel is performed. The control information format of the third control channel is in a one-to-one correspondence with the index value of the control information format of the third control channel.

It should be noted that, for a technical effect of the communication method in the fifth aspect, refer to the technical effect of the communication method in the second aspect. Details are not described herein again.

According to a sixth aspect, a communication method is provided. The communication method includes: A second terminal apparatus receives a fourth control channel and a data channel from a first terminal apparatus in a first slot. The fourth control channel carries a third demodulation reference sequence and fourth control information, and the third demodulation reference sequence is used to demodulate the fourth control channel.

The second terminal apparatus demodulates the fourth control channel to obtain the fourth control information. Then, the second terminal apparatus determines a demodulation reference sequence configuration of the data channel based on the third demodulation reference sequence, and demodulates a data channel based on the fourth control information and the demodulation reference sequence configuration that is of the data channel.

In a possible design method, that the second terminal apparatus determines a demodulation reference sequence configuration of the data channel based on the third demodulation reference sequence may include: The second terminal apparatus determines an initial value of the third demodulation reference sequence. The second terminal apparatus determines the demodulation reference sequence configuration of the data channel based on the initial value of the third demodulation reference sequence.

Optionally, that the second terminal apparatus determines an initial value of the third demodulation reference sequence may include: The second terminal apparatus determines a third candidate initial value set based on a candidate demodulation reference sequence configuration set, and generates a third candidate demodulation reference sequence set based on the third candidate initial value set. The candidate demodulation reference sequence configuration set includes one or more candidate demodulation reference sequence configurations of the data channel, the third candidate initial value set includes one or more candidate initial values of the third demodulation reference sequence, and the third candidate demodulation reference sequence set includes one or more candidate demodulation reference sequences of the third demodulation reference sequence. Then, the second terminal apparatus performs demodulation and decoding on the fourth control channel by using each candidate demodulation reference sequence in the third candidate demodulation reference sequence set, determines, as the third demodulation reference sequence, a candidate demodulation reference sequence that is in the third candidate demodulation reference sequence set and that can be used to successfully perform demodulation and decoding on the fourth control channel to obtain fourth control information, and determines a candidate initial value corresponding to the third demodulation reference sequence as the initial value of the third demodulation reference sequence.

Optionally, that the second terminal apparatus determines the demodulation reference sequence configuration of the data channel based on the initial value of the third demodulation reference sequence may include: The second terminal apparatus determines the demodulation reference sequence configuration of the data channel based on the initial value of the third demodulation reference sequence, a quantity of symbols included in the first slot, a slot number of the first slot, and a symbol number of a symbol that carries the third demodulation reference sequence and that is in the first slot.

For example, the demodulation reference sequence configuration of the data channel includes any one of the following: a frequency domain pattern, a time domain pattern, or a time-frequency pattern of a demodulation reference sequence of the data channel. The frequency domain pattern of the demodulation reference sequence of the data channel is in a one-to-one correspondence with an index of the frequency domain pattern of the demodulation reference sequence of the data channel. The time domain pattern of the demodulation reference sequence of the data channel is in a one-to-one correspondence with an index of the time domain pattern of the demodulation reference sequence of the data channel. The time-frequency pattern of the demodulation reference sequence of the data channel is in a one-to-one correspondence with an index of the time-frequency pattern of the demodulation reference sequence of the data channel.

Optionally, that the second terminal apparatus determines the demodulation reference sequence configuration of the data channel based on the initial value of the third demodulation reference sequence, a quantity of symbols included in the first slot, a slot number of the first slot, and a symbol number of a symbol that carries the third demodulation reference sequence and that is in the first slot may include: The second terminal apparatus determines any one of the index of the frequency domain pattern, the index of the time domain pattern, or the index of the time-frequency pattern of the demodulation reference sequence of the data channel: $c_{init}=(2^{17}(N_{symb}^{slot}n_{s,f}^{m}+l+1)+i) \bmod (2^{31})$, where $c_{init}$ is the initial value of the third demodulation reference sequence, $N_{symb}^{slot}$ is the quantity of symbols included in the first slot, $n_{s,f}^{m}$ is the slot number of the first slot, l is the symbol number of the symbol that carries the third demodulation reference sequence and that is in the first slot, i is any one of the index of the frequency domain pattern, the index of the time domain pattern, or the index of the time-frequency pattern of the demodulation reference sequence of the data channel, and an operator mod represents a modulo operation.

It should be noted that, for a technical effect of the communication method in the sixth aspect, refer to the technical effect of the communication method in the third aspect. Details are not described herein again.

According to a seventh aspect, a communication apparatus is provided. The communication apparatus includes a processing module and a sending module. The processing module is configured to generate a first demodulation reference sequence based on an aggregation level of a second control channel. The first demodulation reference sequence is used to demodulate a first control channel, a first demodulation reference signal generated based on the first demodulation reference sequence is mapped to the first control channel, and first control information carried on the first control channel and second control information carried on the second control channel are used to demodulate a data channel. The sending module is configured to send the first control channel, the second control channel, and the data channel to a second terminal apparatus in a first slot.

In a possible design, the processing module is further configured to determine an initial value of the first demodulation reference sequence based on the aggregation level of the second control channel. The processing module is further configured to generate the first demodulation reference sequence based on the initial value of the first demodulation reference sequence.

Optionally, the processing module is further configured to determine the initial value of the first demodulation reference sequence based on the aggregation level of the second control channel, a quantity of symbols included in the first slot, a slot number of the first slot, and a symbol number of a symbol that carries the first demodulation reference sequence and that is in the first slot.

For example, the aggregation level of the second control channel is in a one-to-one correspondence with an index value of the aggregation level of the second control channel.

Optionally, the processing module is further configured to determine that the initial value of the first demodulation reference sequence satisfies: $c_{init}=(2^{17}(N_{symb}^{slot}n_{s,f}^{m}+l+1)+k) \bmod (2^{31})$, where $c_{init}$ is the initial value of the first demodulation reference sequence, $N_{symb}^{slot}$ is the quantity of symbols included in the first slot, $n_{s,f}$ is the slot number of the first slot, l is the symbol number of the symbol that carries the first demodulation reference sequence and that is in the first slot, k is the aggregation level of the second control channel, and an operator mod represents a modulo operation.

Optionally, the processing module is further configured to determine that the initial value of the first demodulation reference sequence satisfies: $c_{init}=(2^{17}(N_{symb}^{slot}n_{s,f}^{m}+l+1)+i) \bmod (2^{31})$, where $c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, i is the index value of the aggregation level of the second control channel, and an operator mod represents a modulo operation.

It should be noted that, for a technical effect of the communication apparatus in the seventh aspect, refer to the technical effect of the communication method in the first aspect. Details are not described herein again.

According to an eighth aspect, a communication apparatus is provided. The communication apparatus includes a processing module and a sending module. The processing module is configured to generate a second demodulation reference sequence based on an aggregation level of a third control channel. The second demodulation reference sequence is used to demodulate the third control channel, a second demodulation reference signal generated based on the second demodulation reference sequence is mapped to the third control channel, and third control information carried on the third control channel is used to demodulate a data channel. The sending module is configured to send the third control channel and the data channel to a second terminal apparatus in a first slot.

In a possible design, the processing module is further configured to determine an initial value of the second demodulation reference sequence based on the aggregation level of the third control channel. The processing module is further configured to generate the second demodulation reference sequence based on the initial value of the second demodulation reference sequence.

Optionally, the processing module is further configured to determine the initial value of the second demodulation reference sequence based on the aggregation level of the third control channel, a quantity of symbols included in the first slot, a slot number of the first slot, and a symbol number of a symbol that carries the second demodulation reference sequence and that is in the first slot.

For example, the aggregation level of the third control channel is in a one-to-one correspondence with an index value of the aggregation level of the third control channel.

Optionally, the processing module is further configured to determine that the initial value of the second demodulation reference sequence satisfies: $c_{init}=(2^{17}(N_{symb}^{slot}n_{s,f}^{m}+l+1)+k) \bmod(2^{31})$, where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, k is the aggregation level of the third control channel, and an operator mod represents a modulo operation.

Optionally, the processing module is further configured to determine that the initial value of the second demodulation reference sequence satisfies: $c_{init}=(2^{17}(N_{symb}^{slot}n_{s,f}^{m}+l+1)+i) \bmod(2^{31})$, where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, i is the index value of the aggregation level of the third control channel, and an operator mod represents a modulo operation.

It should be noted that, for a technical effect of the communication apparatus in the eighth aspect, refer to the technical effect of the communication method in the second aspect. Details are not described herein again.

According to a ninth aspect, a communication apparatus is provided. The communication apparatus includes a processing module and a sending module. The processing module is configured to generate a third demodulation reference sequence based on a demodulation reference sequence configuration of a data channel, where the third demodulation reference sequence is used to demodulate a fourth control channel, and fourth control information carried on the fourth control channel is used to demodulate the data channel. The sending module is further configured to send the fourth control channel and the data channel to a second terminal apparatus in a first slot.

In a possible design, the processing module is further configured to determine an initial value of the third demodulation reference sequence based on the demodulation reference sequence configuration of the data channel. The processing module is further configured to generate the third demodulation reference sequence based on the initial value of the third demodulation reference sequence.

Optionally, the processing module is further configured to determine the initial value of the third demodulation reference sequence based on the demodulation reference sequence configuration of the data channel, a quantity of symbols included in the first slot, a slot number of the first slot, and a symbol number of a symbol that carries the third demodulation reference sequence and that is in the first slot.

For example, the demodulation reference sequence configuration of the data channel includes any one of the following: a frequency domain pattern, a time domain pattern, or a time-frequency pattern of a demodulation reference sequence of the data channel. The frequency domain pattern of the demodulation reference sequence of the data channel is in a one-to-one correspondence with an index of the frequency domain pattern of the demodulation reference sequence of the data channel. The time domain pattern of the demodulation reference sequence of the data channel is in a one-to-one correspondence with an index of the time domain pattern of the demodulation reference sequence of the data channel. The time-frequency pattern of the demodulation reference sequence of the data channel is in a one-to-one correspondence with an index of the time-frequency pattern of the demodulation reference sequence of the data channel.

Optionally, the processing module is further configured to determine that the initial value of the third demodulation reference sequence satisfies: $c_{init}=(2^{17}(N_{symb}^{slot}n_{s,f}^{m}+l+1)+i) \bmod(2^{31})$, where $c_{init}$ is the initial value of the third demodulation reference sequence, $N_{symb}^{slot}$ is the quantity of symbols included in the first slot, $n_{s,f}^{m}$ the slot number of the first slot, l is the symbol number of the symbol that carries the third demodulation reference sequence and that is in the first slot, i is any one of the index of the frequency domain pattern, the index of the time domain pattern, or the index of the time-frequency pattern of the demodulation reference sequence of the data channel, and an operator mod represents a modulo operation.

It should be noted that, for a technical effect of the communication apparatus in the ninth aspect, refer to the technical effect of the communication method in the third aspect. Details are not described herein again.

According to a tenth aspect, a communication apparatus is provided. The communication apparatus includes a processing module and a receiving module. The receiving module is configured to receive a first control channel from a first terminal apparatus in a first slot. The first control channel carries a first demodulation reference sequence and first control information, and the first demodulation reference sequence for generating a first demodulation reference signal is used to demodulate the first control channel. The processing module is configured to determine an aggregation level of a second control channel based on the first demodulation reference sequence. The processing module is further configured to receive the second control channel from the first terminal apparatus in the first slot based on the aggregation level of the second control channel. The first control information carried on the first control channel and second control information carried on the second control channel are used to demodulate the data channel. The receiving module is further configured to receive the data channel from the first terminal apparatus in the first slot based on the first control information and the second control information.

In a possible design, the processing module is further configured to determine an initial value of the first demodulation reference sequence. The processing module is further configured to determine the aggregation level of the second control channel based on the initial value of the first demodulation reference sequence.

Optionally, the processing module is further configured to determine a first candidate initial value set based on a first candidate aggregation level set. The first candidate aggregation level set includes one or more candidate aggregation levels of the second control channel, and the first candidate initial value set includes one or more candidate initial values of the first demodulation reference sequence. The processing module is further configured to generate a first candidate demodulation reference sequence set based on the first candidate initial value set. The first candidate demodulation reference sequence set includes one or more candidate demodulation reference sequences of the first demodulation reference sequence. The processing module is further configured to perform demodulation and decoding on the first control channel by using each candidate demodulation reference sequence in the first candidate demodulation reference sequence set. The processing module is further configured to: determine, as the first demodulation reference sequence, a candidate demodulation reference sequence that is in the first candidate demodulation reference sequence set and that can be used to successfully perform demodulation and decoding on the first control channel to obtain first control information, and determine a candidate initial value corresponding to the first demodulation reference sequence as the initial value of the first demodulation reference sequence.

Optionally, the processing module is further configured to determine the aggregation level of the second control channel based on the initial value of the first demodulation reference sequence, a quantity of symbols included in the first slot, a slot number of the first slot, and a symbol number of a symbol that carries the first demodulation reference sequence and that is in the first slot.

For example, the aggregation level of the second control channel is in a one-to-one correspondence with an index value of the aggregation level of the second control channel.

Optionally, the processing module is further configured to determine that the aggregation level of the second control channel satisfies: $c_{init}=(2^{17}(N_{symb}^{slot}n_{s,f}^{m}+l+1)+k)\bmod(2^{31})$, where $c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, k is the aggregation level of the second control channel, and an operator mod represents a modulo operation.

Optionally, the processing module is further configured to determine that the index value of the aggregation level of the second control channel satisfies: $c_{init}=(2^{17}(N_{symb}^{slot}n_{s,f}^{m}+l+1)+i)\bmod(2^{31})$, where $c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, i is the index value of the aggregation level of the second control channel, and an operator mod represents a modulo operation.

It should be noted that, for a technical effect of the communication apparatus in the tenth aspect, refer to the technical effect of the communication method in the first aspect. Details are not described herein again.

According to an eleventh aspect, a communication apparatus is provided. The communication apparatus includes a processing module and a receiving module. The receiving module is configured to receive, from a first terminal apparatus in a first slot, a second demodulation reference signal corresponding to a third control channel. A second demodulation reference sequence for generating the second demodulation reference signal is used to demodulate third control information carried on the third control channel, and the third control information is used to demodulate a data channel. The processing module is configured to determine an aggregation level of the third control channel based on the second demodulation reference sequence. The processing module is further configured to receive the third control information from the first terminal apparatus based on the aggregation level of the third control channel. The receiving module is further configured to receive the data channel from the first terminal apparatus in the first slot based on the third control information.

In a possible design, the processing module is further configured to determine an initial value of the second demodulation reference sequence. The processing module is further configured to determine the aggregation level of the third control channel based on the initial value of the second demodulation reference sequence.

Optionally, the processing module is further configured to determine a second candidate initial value set based on a second candidate aggregation level set. The second candidate aggregation level set includes one or more candidate aggregation levels of the third control channel, and the second candidate initial value set includes one or more candidate initial values of the second demodulation reference sequence. The processing module is further configured to generate a second candidate demodulation reference sequence set based on the second candidate initial value set. The second candidate demodulation reference sequence set includes one or more candidate demodulation reference sequences of the second demodulation reference sequence. The processing module is further configured to perform correlation detection on a received signal of the third control channel by using each candidate demodulation reference sequence in the second candidate demodulation reference sequence set. The processing module is further configured to: determine a candidate demodulation reference sequence with a largest average correlation value in the second candidate demodulation reference sequence set as the second demodulation reference sequence, and determine a candidate initial value corresponding to the second demodulation reference sequence as the initial value of the second demodulation reference sequence.

In a possible implementation, the processing module is further configured to calculate an average correlation value corresponding to each candidate demodulation reference sequence in the second candidate demodulation reference sequence set:

$$c = \frac{1}{N}\sum_{n=0}^{N-1}\|h_n * h_{n,k}\|^2,$$

where c is an average correlation value of a first candidate demodulation reference sequence, the first candidate demodulation reference sequence is any candidate demodulation reference sequence in the second candidate demodulation reference sequence set, $h_n$ is the received signal of the third control channel, $h_{n,k}$ is the first candidate demodulation reference sequence, k is a candidate aggregation level corresponding to the first candidate demodulation reference sequence in the second candidate aggregation level set, $h_{n,k}$ is a conjugate complex number of $h_n$, $0 \le n \le N-1$, and N is a sequence length of $h_{n,k}$.

In another possible implementation, the processing module is further configured to calculate an average correlation value corresponding to each candidate demodulation reference sequence in the second candidate demodulation reference sequence set:

$$c = \frac{1}{N}\sum_{n=0}^{N-1} \|h_n * h_{n,i}\|^2,$$

where c is an average correlation value of a first candidate demodulation reference sequence, the first candidate demodulation reference sequence is any candidate demodulation reference sequence in the second candidate demodulation reference sequence set, $h_n$ is the received signal of the third control channel, $h_{n,i}$ is the first candidate demodulation reference sequence, i is an index value of the candidate aggregation level corresponding to the first candidate demodulation reference sequence in the second candidate aggregation level set, $h_{n,i}$ is a conjugate complex number of $h_n$, $0 \le n < N-1$, and N is a sequence length of $h_{n,i}$.

For example, the average correlation value includes a first average correlation value and a second average correlation value. The first average correlation value is an average correlation value on a first resource scheduling unit, the second average correlation value is an average correlation value on a second resource scheduling unit, and the first resource scheduling unit and the second resource scheduling unit are consecutive in frequency domain. Optionally, the processing module is further configured to: if a ratio of the first average correlation value to the second average correlation value is greater than a first ratio threshold and less than a second ratio threshold, determine that correlation of the first resource scheduling unit is consistent with correlation of the second resource scheduling unit.

Optionally, the processing module is further configured to determine the aggregation level of the third control channel based on the initial value of the second demodulation reference sequence, a quantity of symbols included in the first slot, a slot number of the first slot, and a symbol number of a symbol that carries the second demodulation reference sequence and that is in the first slot.

For example, the aggregation level of the third control channel is in a one-to-one correspondence with an index value of the aggregation level of the third control channel.

Optionally, the processing module is further configured to determine that the aggregation level of the third control channel satisfies: $c_{init}=(2^{17}(N_{symb}^{slot}n_{s,f}^{m}+l+1)+k)\mod(2^{31})$, where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, k is the aggregation level of the third control channel, and an operator mod represents a modulo operation.

Optionally, the processing module is further configured to determine that the index value of the aggregation level of the third control channel satisfies: $c_{init}=(2^{17}(N_{symb}^{slot}n_{s,f}^{m}+l+1)+i)\mod(2^{31})$, where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, i is the index value of the aggregation level of the third control channel, and an operator mod represents a modulo operation.

It should be noted that, for a technical effect of the communication apparatus in the eleventh aspect, refer to the technical effect of the communication method in the second aspect. Details are not described herein again.

According to a twelfth aspect, a communication apparatus is provided. The communication apparatus includes a processing module and a receiving module. The receiving module is configured to receive a fourth control channel and a data channel from a first terminal apparatus in a first slot. The fourth control channel carries a third demodulation reference sequence and fourth control information, and the third demodulation reference sequence is used to demodulate the fourth control channel. The processing module is further configured to demodulate the fourth control channel, to obtain the fourth control information. The processing module is further configured to determine a demodulation reference sequence configuration of the data channel based on the third demodulation reference sequence. The processing module is further configured to demodulate the data channel based on the fourth control information and the demodulation reference sequence configuration of the data channel.

In a possible design, the processing module is further configured to determine an initial value of the third demodulation reference sequence. The processing module is further configured to determine a demodulation reference sequence configuration of the data channel based on the initial value of the third demodulation reference sequence.

Optionally, the processing module is further configured to determine a third candidate initial value set based on a candidate demodulation reference sequence configuration set. The candidate demodulation reference sequence configuration set includes one or more candidate demodulation reference sequence configurations of the data channel, and the third candidate initial value set includes one or more candidate initial values of the third demodulation reference sequence. The processing module is further configured to generate a third candidate demodulation reference sequence set based on the third candidate initial value set. The third candidate demodulation reference sequence set includes one or more candidate demodulation reference sequences of the third demodulation reference sequence. The processing module is further configured to perform demodulation and decoding on the fourth control channel by using each candidate demodulation reference sequence in the third candidate demodulation reference sequence set. The processing module is further configured to: determine, as the third demodulation reference sequence, a candidate demodulation reference sequence that is in the third candidate demodulation reference sequence set and that can be used to successfully perform demodulation and decoding on the fourth control channel to obtain fourth control information, and determine a candidate initial value corresponding to the third demodulation reference sequence as the initial value of the third demodulation reference sequence.

Optionally, the processing module is further configured to determine the demodulation reference sequence configuration of the data channel based on the initial value of the third demodulation reference sequence, a quantity of symbols included in the first slot, a slot number of the first slot, and a symbol number of a symbol that carries the third demodulation reference sequence and that is in the first slot.

For example, the demodulation reference sequence configuration of the data channel includes any one of the following: a frequency domain pattern, a time domain pattern, or a time-frequency pattern of a demodulation reference sequence of the data channel. The frequency domain pattern of the demodulation reference sequence of the data channel is in a one-to-one correspondence with an index of the frequency domain pattern of the demodulation reference sequence of the data channel. The time domain pattern of the demodulation reference sequence of the data channel is in a one-to-one correspondence with an index of the time domain pattern of the demodulation reference sequence of the data channel. The time-frequency pattern of the demodulation reference sequence of the data channel is in a one-to-one correspondence with an index of the time-frequency pattern of the demodulation reference sequence of the data channel.

Optionally, the processing module is further configured to determine any one of the index of the frequency domain pattern, the index of the time domain pattern, or the index of the time-frequency pattern of the demodulation reference sequence of the data channel according to the following formula: $c_{init}=(2^{17}(N_{symb}^{slot}n_{s,f}^{m}+l+1)+i)\mod(2^{31})$, where $c_{init}$ is the initial value of the third demodulation reference sequence, $N_{symb}^{slot}$ is the quantity of symbols included in the first slot, $n_{s,f}^{m}$ is the slot number of the first slot, l is the symbol number of the symbol that carries the third demodulation reference sequence and that is in the first slot, i is any one of the index of the frequency domain pattern, the index of the time domain pattern, or the index of the time-frequency pattern of the demodulation reference sequence of the data channel, and an operator mod represents a modulo operation.

It should be noted that, for a technical effect of the communication apparatus in the twelfth aspect, refer to the technical effect of the communication method in the third aspect. Details are not described herein again.

According to a thirteenth aspect, a communication apparatus is provided. The communication apparatus includes a processor. The processor is coupled to a memory. The memory is configured to store a computer program. The processor is configured to execute the computer program stored in the memory, so that the communication apparatus performs the communication method according to any one of the possible implementations of the first aspect to the sixth aspect.

In a possible design, the communication apparatus according to the thirteenth aspect may perform a function of the first terminal apparatus or a function of the second terminal apparatus.

In another possible design, the communication apparatus according to the thirteenth aspect may perform a function of the first terminal apparatus and a function of the second terminal apparatus.

In a possible design, the communication apparatus according to the thirteenth aspect may further include a transceiver. The transceiver may be a transceiver circuit or an input/output interface. The transceiver may be used by the communication apparatus to communicate with another communication apparatus.

In this application, the communication apparatus according to the thirteenth aspect may be the first terminal apparatus and/or the second terminal apparatus, or a chip or a chip system disposed inside the first terminal apparatus and/or the second terminal apparatus.

According to a fourteenth aspect, a communication system is provided. The system includes the first terminal apparatus and one or more second terminal apparatuses.

According to a fifteenth aspect, a computer-readable storage medium is provided. The computer-readable storage medium stores computer instructions. When the computer instructions are run on a computer, the computer is enabled to perform the communication method according to any one of the possible implementations of the first aspect to the sixth aspect.

According to a sixteenth aspect, a computer program product including instructions is provided. The computer program product includes a computer program or the instructions. When the computer program or the instructions are run on a computer, the computer is enabled to perform the communication method according to any one of the possible implementations of the first aspect to the sixth aspect.

DESCRIPTION OF EMBODIMENTS

The following describes technical solutions of this application with reference to the accompanying drawings.

The technical solutions in embodiments of this application may be used in various communication systems, for example, a V2X communication system, a device-to-device (D2D) communication system, an internet of vehicles communication system, a long term evolution (LTE) system, an LTE frequency division duplex (FDD) system, an LTE time division duplex (TDD) system, a worldwide interoperability for microwave access (WiMAX) communication system, a 5th generation (5G) mobile communication system such as an NR system, and a future communication system such as a 6G system.

This application presents aspects, embodiments, or features by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "for example" and "such as" are used to represent giving an example, an illustration, or a description. Any embodiment or design scheme described as an "example" in this application should not be interpreted as being more preferred or having more advantages than another embodiment or design scheme. The term "example" is used to present an example.

In embodiments of this application, the terms "information", "signal", "message", "channel", and "signaling" may sometimes be interchangeably used. It should be noted that meanings expressed by the terms are consistent when differences between the terms are not emphasized. "Of", "relevant", and "corresponding" may be interchangeably used sometimes. It should be noted that meanings expressed by the terms are consistent when differences between the terms are not emphasized.

In embodiments of this application, sometimes a subscript such as $W_1$ may be written in an incorrect form such as W1. Expressed meanings are consistent when differences between them are not emphasized.

A network architecture and a service scenario that are described in embodiments of this application are intended to describe technical solutions in embodiments of this application more clearly, and do not constitute a limitation on the technical solutions provided in embodiments of this application. A person of ordinary skill in the art may be aware that: With evolution of the network architecture and emergence of new service scenarios, technical solutions provided in embodiments of this application are also applicable to similar technical problems.

Figure 1:
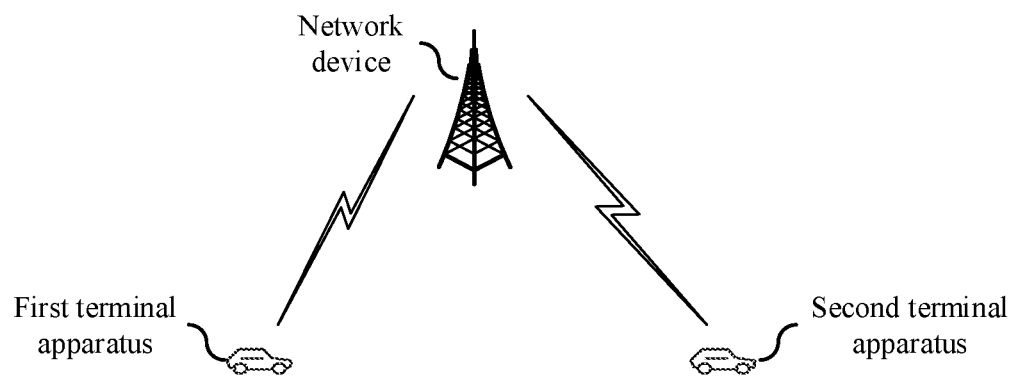
FIG. 1 is a schematic diagram of an architecture of a communication system according to an embodiment of this application.

Some scenarios in embodiments of this application are described by using a scenario in a V2X communication system shown in FIG. 1 as an example. It should be noted that solutions in embodiments of this application may also be used in another mobile communication system, and a corresponding name may also be replaced with a name of a corresponding function in the another mobile communication system.

For ease of understanding embodiments of this application, the V2X communication system shown in FIG. 1 is used as an example to describe in detail a communication system applicable to embodiments of this application.

As shown in FIG. 1, the V2X communication system includes a plurality of terminal devices and one or more network devices.

In embodiments of this application, the network device is a device that is located on a network side of the V2X communication system and that has a wireless transceiver function, or a chip that may be disposed in the device. The network device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (transmission and reception point (TRP) or transmission point (TP)), or the like. Alternatively, the network device may be a next generation NodeB (gNB) or a transmission point (TRP or TP) in a 5G system such as a new radio (NR) system, or one antenna panel or a group of antenna panels (including a plurality of antenna panels) of a base station in a 5G system, or may be a network node, such as a baseband unit (BBU), a distributed unit (DU), or a road side unit (RSU) with a base station function, that constitutes a gNB or a transmission point, or the like.

The terminal device is a terminal that accesses the V2X communication system and that has the wireless transceiver function, or a chip that can be disposed in the terminal. The terminal device may also be referred to as a user apparatus, an access terminal, a subscriber unit, a subscriber station, a mobile station, a remote station, a remote terminal, a mobile device, a user terminal, a terminal, a wireless communication device, a user agent or a user apparatus. The terminal device in embodiments of this application may be a mobile phone, a tablet (for example, Pad), a computer with a wireless receiving and sending function, a virtual reality (VR) terminal device, an augmented reality (AR) terminal device, a wireless terminal in industrial control, a wireless terminal in unmanned driving (or self driving), a wireless terminal in telemedicine (or remote medical), a wireless terminal in a smart grid, a wireless terminal in transportation safety, a wireless terminal in a smart city, a wireless terminal in a smart home, a vehicle-mounted terminal, an RSU that has a terminal function, or the like. The terminal device in this application may alternatively be a vehicle-mounted module, a vehicle-mounted module, a vehicle-mounted component, a vehicle-mounted chip, or a vehicle-mounted unit with which a vehicle is equipped as one or more components or units. By using the vehicle-mounted module, the vehicle-mounted module, the vehicle-mounted component, the vehicle-mounted chip, or the vehicle-mounted unit with which the vehicle is equipped, the vehicle may implement the communication method provided in this application.

It should be noted that the foregoing network device is optional. For example, if there is a base station, there is a scenario with network coverage. If there is no base station, there is a scenario without network coverage. In the scenario with network coverage, communication between terminal devices may be performed by using a resource configured by the network device. In the scenario without network coverage, communication between terminal devices may be performed by using a preconfigured resource.

It should be understood that FIG. 1 is merely a simplified schematic diagram of an example for ease of understanding. The communication system may further include another network device and/or another terminal device that are/is not shown in FIG. 1.

Figure 2:
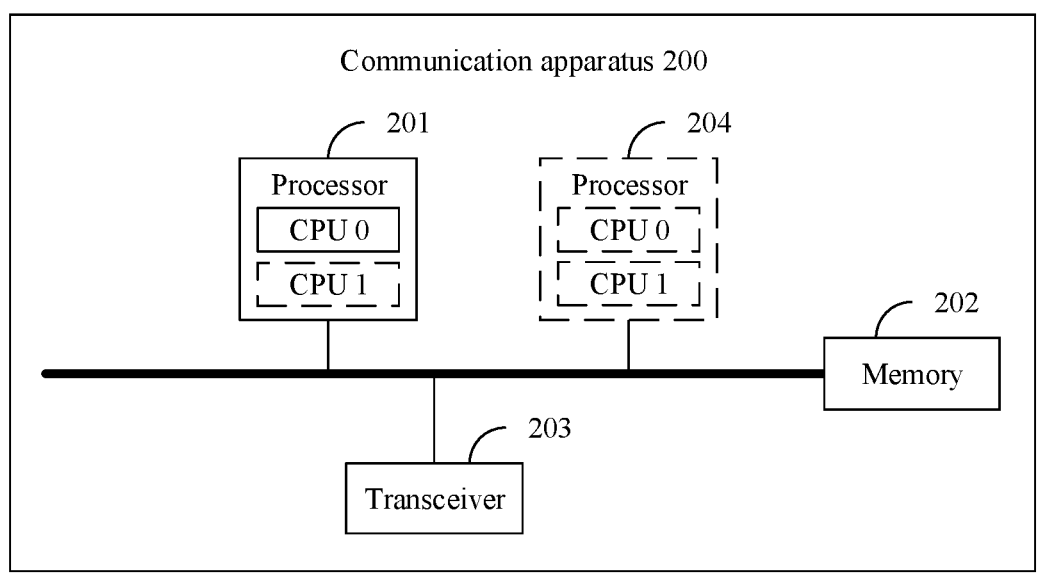
FIG. 2 is a first schematic diagram of a structure of a communication apparatus according to an embodiment of this application.

The communication method provided in embodiments of this application is applicable to a communication apparatus 200 shown in FIG. 2. The communication apparatus 200 may be a terminal device, or may be a chip used in a terminal device, or another component having a terminal function. As shown in FIG. 2, the communication apparatus 200 may include at least one processor 201, a memory 202, and a transceiver 203. There is a signal connection between the at least one processor 201, the memory 202, and the transceiver 203. For example, the processor 201, the memory 202, and the transceiver 203 may be connected through a bus.

The following describes each component of the communication apparatus 200 in detail with reference to FIG. 2.

The processor 201 is a control center of the communication apparatus 200, and may be one processor or may be a collective term of a plurality of processing elements. For example, the processor 201 is one or more central processing units (CPUs), or may be an application-specific integrated circuit (ASIC), or is configured as one or more integrated circuits implementing embodiments of this application, for example, one or more digital signal processors (DSPs), or one or more field programmable gate arrays (FPGAs).

The processor 201 may execute various functions of the communication apparatus 200 by running or executing a software program stored in the memory 202 and invoking data stored in the memory 202.

During specific implementation, in an embodiment, the processor 201 may include one or more CPUs, for example, a CPU 0 and a CPU 1 shown in FIG. 2.

During specific implementation, in an embodiment, the communication apparatus 200 may alternatively include a plurality of processors, for example, the processor 201 and a processor 204 that are shown in FIG. 2. Each of the processors may be a single-core processor or may be a multi-core processor. The processor herein may be one or more communication devices, circuits, and/or processing cores configured to process data (for example, computer program instructions).

The memory 202 may be a read-only memory (ROM) or another type of static storage communication device that can store static information and instructions; or a random access memory (RAM) or another type of dynamic storage communication device that can store information and instructions. The memory 202 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of an instruction or a data structure and that is accessible by a computer, but is not limited thereto. The memory 202 may exist independently, or may be integrated with the processor 201.

The memory 202 is configured to store a software program for performing solutions of this application, and the processor 201 controls execution of the software program.

In this embodiment of this application, the memory 202 may store the software program or instructions. After the communication apparatus 200 is powered on, the processor 201 may read and execute the software program or the instructions stored in the memory 202, so that the communication apparatus 200 can perform a communication method described in the following method embodiments. For the foregoing specific implementations, refer to the following method embodiments.

The transceiver 203 is configured to communicate with another communication apparatus. Certainly, the transceiver 203 may be further configured to communicate with a communication network, such as the Ethernet, a radio access network (RAN), or a wireless local area network (WLAN). The transceiver 203 may include a receiving unit for implementing a receiving function and a sending unit for implementing a sending function.

A structure of the communication apparatus 200 shown in FIG. 2 does not constitute a limitation on the communication apparatus. An actual communication apparatus may include more or fewer components than those shown in the figure, or combine some components, or have different component arrangement.

The following describes in detail communication methods provided in embodiments of this application with reference to FIG. 3 to FIG. 14.

Figure 3:
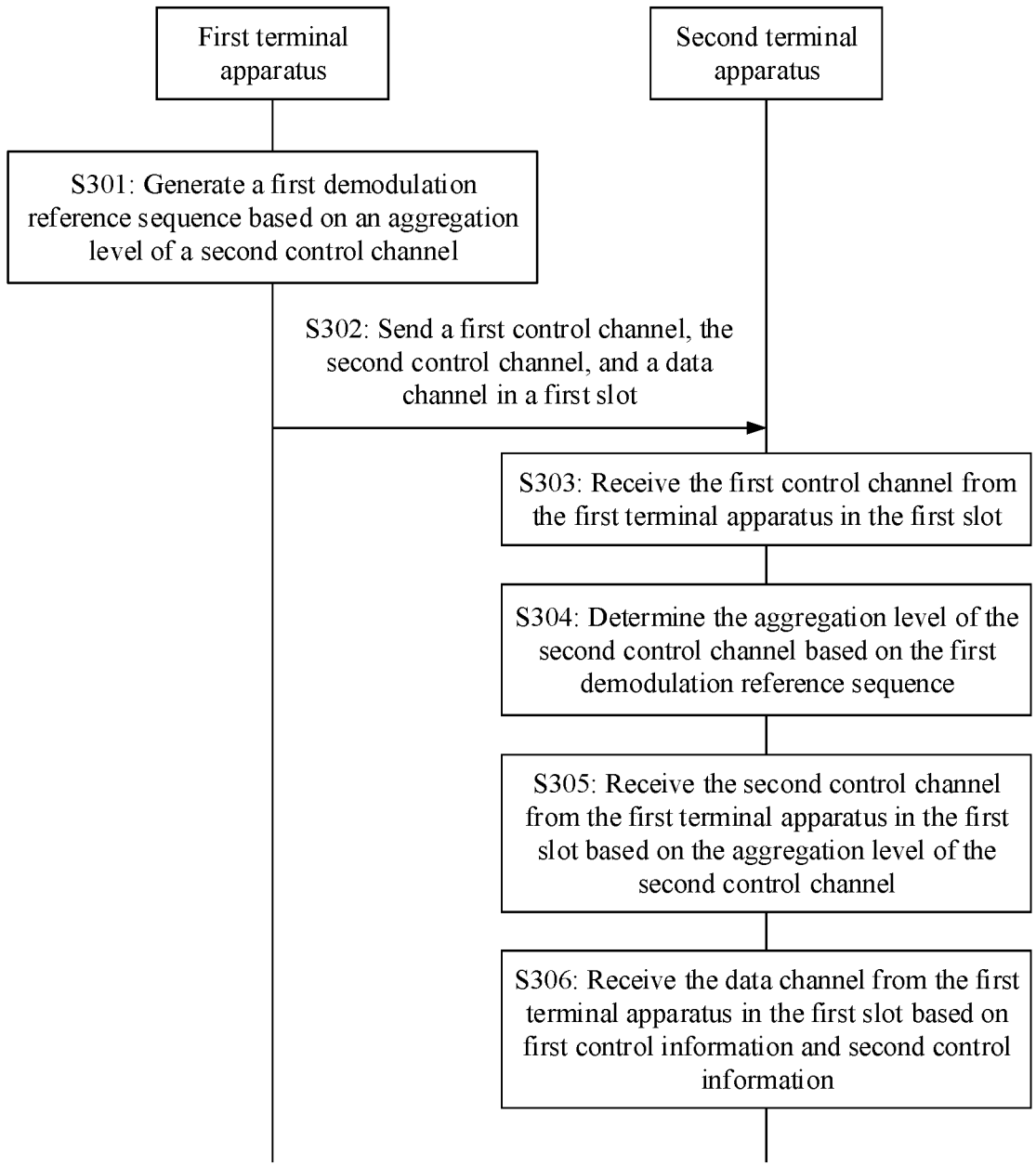
FIG. 3 is a first schematic flowchart of a communication method according to an embodiment of this application.

FIG. 3 is a schematic flowchart of a communication method according to an embodiment of this application. The communication method is applicable to an application scenario of two-stage control channel, and is used to complete communication between the plurality of terminal apparatuses shown in FIG. 1.

The two-stage control channel mean that a demodulation reference sequence of the first-stage control channel is used to implicitly indicate demodulation indication information of the second-stage control channel, for example, an aggregation level of the second-stage control channel. The aggregation level means that a minimum resource scheduling granularity of a control channel is defined, and channel coding and resource mapping allow to be performed by using a physical resource that is an integer multiple of the minimum resource scheduling granularity during coding of the control channel, to satisfy coding requirements of control channels at different code rates. The minimum resource scheduling granularity may be one or more resource blocks (RBs). For example, different aggregation levels may be selected in different transmission slots based on variation of channel quality of the control channel to perform coding, to implement variable-bit-rate channel coding of the control channel.

For example, a V2X communication system that is based on an NR technology can support services of a unicast type, a multicast type, a broadcast type, and the like. For different service requirements, required control information field lengths are different. A possible method for implementing control information is to divide a control channel into two stages. The first-stage control channel is used to perform transmission of basic control signaling such as broadcast information, and the second-stage control channel is used to perform transmission of special decoding information required by a unicast service, a multicast service, and/or the like. For example, when a distance between a sender and a receiver changes, and/or a channel condition between the sender and the receiver changes, an aggregation level of a resource used to map the special decoding information of the unicast service and/or the multicast service may be adjusted in real time, thereby implementing variable-bit-rate channel coding of the unicast service and/or the multicast service. In this embodiment of this application, the aggregation level of the second-stage control channel may be one, two, four, or eight times the minimum resource scheduling granularity.

Figure 4:
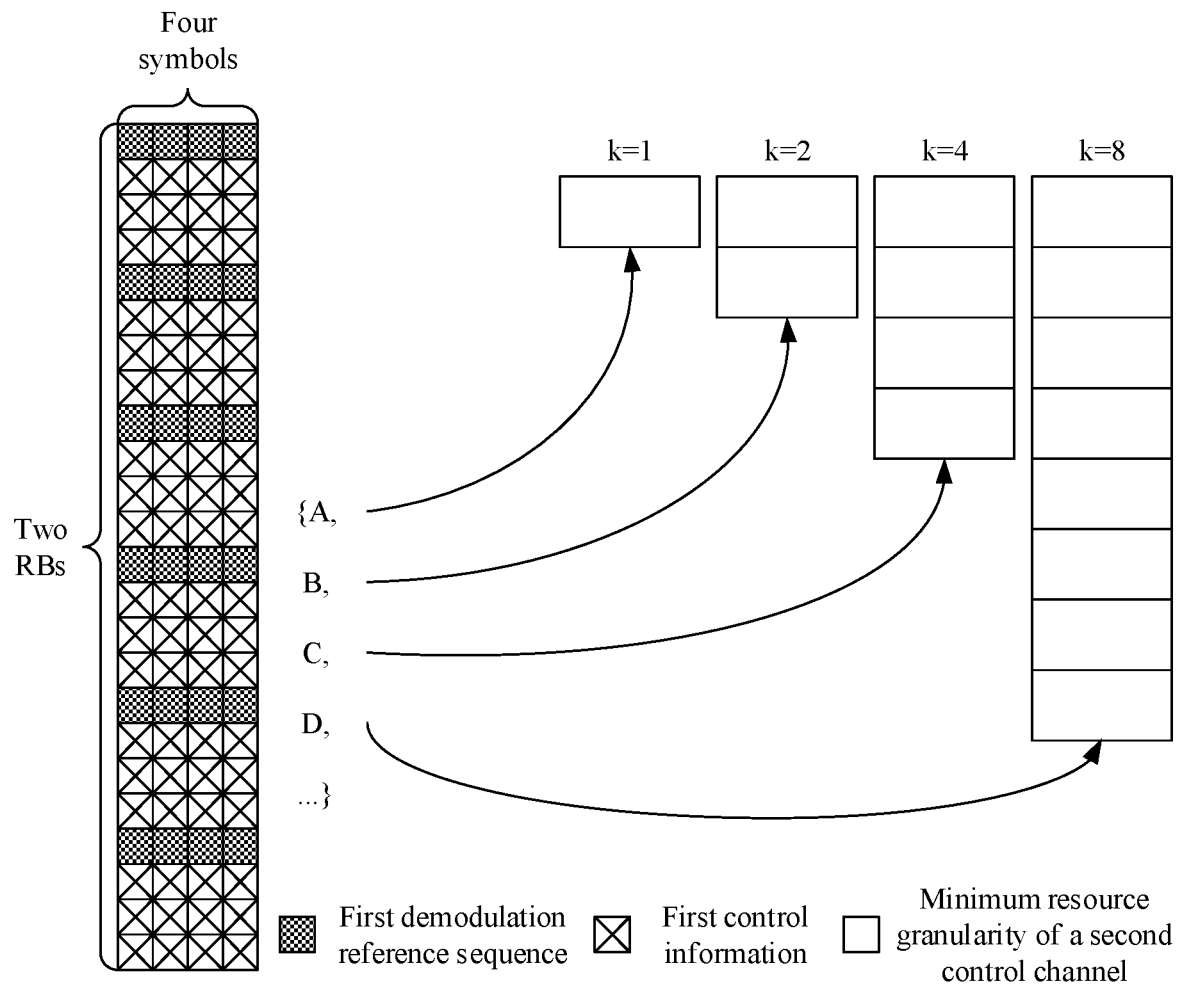
FIG. 4 is a schematic diagram of two-stage control channel according to an embodiment of this application.

FIG. 4 is a schematic diagram of two-stage control channel according to an embodiment of this application. As shown in FIG. 4, for a first control channel that is used as the first-stage control channel, channel coding and resource mapping are performed by using a physical resource with a fixed code rate, that is, channel coding and resource mapping are performed for the first control channel by using a fixed aggregation level. For a second control channel that is used as the second-stage control channel, channel coding and resource mapping are performed by using a variable code rate, that is, channel coding and resource mapping are performed for the second control channel by using a variable aggregation level. Refer to FIG. 4. A demodulation reference sequence set {A, B, C, D, . . . } may be configured for the first control channel. The demodulation reference sequence set includes a plurality of demodulation reference sequences, and different demodulation reference sequences respectively correspond to different aggregation levels of the second-stage control channel. For example, aggregation levels of the second-stage control channel that correspond to demodulation reference sequences A, B, and C are respectively 1, 2, and 4. For details, refer to the following descriptions. Details are not described herein again.

As shown in FIG. 3, the communication method includes the following steps.

S301: A first terminal apparatus generates a first demodulation reference sequence based on an aggregation level of the second control channel.

The first demodulation reference sequence is used to demodulate the first control channel, a first demodulation reference signal generated based on the first demodulation reference sequence is mapped to the first control channel, and first control information carried on the first control channel and second control information carried on the second control channel are used to demodulate a data channel.

It should be noted that the first control information and the second control information are two-stage control information scheduled in one data transmission process. The data channel is a data channel (associated) associated with both the first control information and the second control information. Physically, the data channel, the first control information, and the second control information that are associated are usually located in a same slot.

In a possible design method, that a first terminal apparatus generates a first demodulation reference sequence based on an aggregation level of the second control channel in S301 may include the following steps: Step 1: The first terminal apparatus determines an initial value of the first demodulation reference sequence based on the aggregation level of the second control channel. Step 2: The first terminal apparatus generates the first demodulation reference sequence based on the initial value of the first demodulation reference sequence.

For example, the first terminal apparatus may adaptively select the aggregation level of the second control channel based on a current channel condition, or may set the aggregation level of the second control channel based on a configuration on a network side, or may select the aggregation level of the second control channel based on a service type. It is easy to understand that a correspondence between the aggregation level of the second control channel and the channel condition or the service type of the second control channel may be dynamically configured by a network through signaling, or may be preconfigured by a system. This is not limited in this embodiment of this application.

Figure 5:
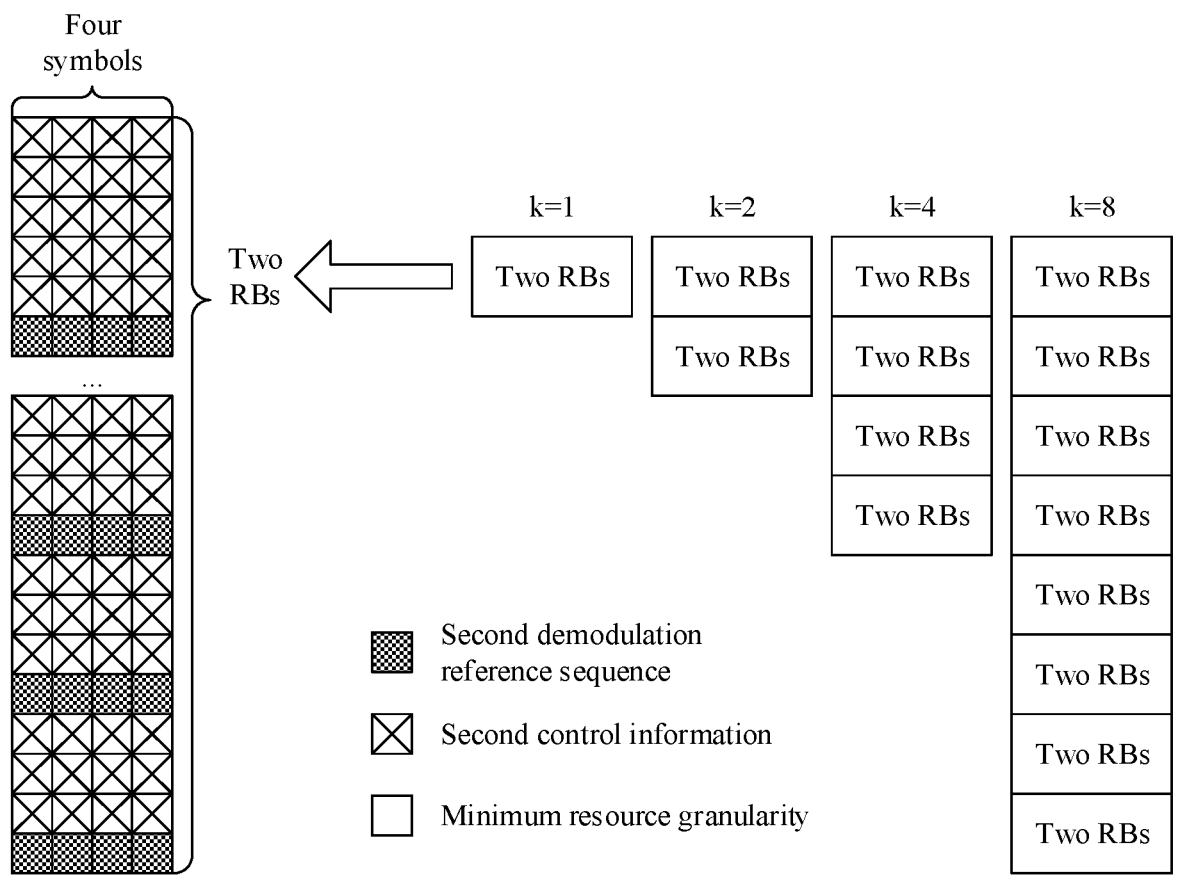
FIG. 5 is a schematic diagram of a correspondence between a resource configuration and an aggregation level of a second control channel according to an embodiment of this application.

FIG. 5 is a schematic diagram of a correspondence between an aggregation level and a resource configuration of a second control channel according to an embodiment of this application. As shown in FIG. 5, on each minimum mapping unit of the second control channel, a mapping position of a demodulation reference sequence of the second control channel is fixed relative to a mapping position of data of the second control channel, in other words, density of the demodulation reference sequence is fixed, and a relative start position, on each RB, of the demodulation reference sequence is fixed. When the second control channel uses different aggregation levels, time-frequency resources corresponding to the second control channel as a whole are in a multiple relationship. In other words, when the aggregation level increases by times, a corresponding length of the demodulation reference sequence of the second control channel also increases by the same times.

For example, as shown in FIG. 5, one RB includes 12 resource elements (REs) in total, and corresponding RE numbers are sequentially 0 to 11. Three REs, namely, three REs numbered 0, 4, and 8, are used to carry the demodulation reference sequence of the second control channel. In this case, for a second control channel whose minimum resource granularity is two RBs, when an aggregation level is 1, a length of a demodulation reference sequence of the second control channel is 6; when the aggregation level is 2, the length of the demodulation reference sequence of the second control channel is 12; when the aggregation level is 4, the length of the demodulation reference sequence of the second control channel is 24; and when the aggregation level is 8, the length of the demodulation reference sequence of the second control channel is 48. The rest may be deduced by analogy.

It should be noted that the entire demodulation reference sequence of the second control channel is generated based on an overall sequence length of the second control channel, instead of being separately generated based on each minimum resource scheduling granularity. To be specific, a complete demodulation reference sequence is generated based on an initial value and a preset method that is for generating a demodulation reference sequence, and then some values that are first in the complete demodulation reference sequence are intercepted based on RB quantities corresponding to different aggregation levels and a quantity of REs in one RB that are used to carry the demodulation reference sequence, and are used as a demodulation reference sequence corresponding to a current aggregation level of the second control channel. For example, as shown in FIG. 5, it is assumed that a same initial value is used to generate a demodulation reference sequence of the second control channel. When aggregation levels of the second control channel are respectively 1, 2, 4, and 8, first 6, 12, 24, and 48 values of the generated complete demodulation reference sequence are respectively intercepted and used as demodulation reference sequences of the second control channel.

For example, the demodulation reference sequence of the second control channel may be a ZC sequence, or may be a pseudo-noise (PN) sequence, or may be an orthogonal sequence of another type. The demodulation reference sequence of the second control channel may be generated based on an initial value. In other words, provided that the initial value is determined, a unique demodulation reference sequence that is of the second control channel and that corresponds to the initial value may be generated according to the preset method for generating a demodulation reference sequence, for example, a method for generating the foregoing ZC sequence or PN sequence. For the method for generating the ZC sequence and PN sequence, refer to an existing implementation. Details are not described again in this embodiment of this application.

Optionally, that the first terminal apparatus determines an initial value of the first demodulation reference sequence based on the aggregation level of the second control channel in the foregoing step 1 may include the following step: The first terminal apparatus determines the initial value of the first demodulation reference sequence based on the aggregation level of the second control channel, a quantity of symbols included in a first slot, a slot number of the first slot, and a symbol number of a symbol that carries the first demodulation reference sequence and that is in the first slot.

For example, the aggregation level of the second control channel is in a one-to-one correspondence with an index value of the aggregation level of the second control channel.

Table 1 shows a correspondence between an aggregation level k of the second control channel and an index value i of the aggregation level of the second control channel. As shown in Table 1, when the aggregation level k is respectively 1, 2, 4, and 8, the corresponding index value i of the aggregation level is respectively 0, 1, 2, and 3.

TABLE 1

| Index value (i) of the aggregation level | Aggregation level (k) |
|---|---|
| 0 | 1 |
| 1 | 2 |
| 2 | 4 |
| 3 | 8 |

Optionally, that the first terminal apparatus determines the initial value of the first demodulation reference sequence based on the aggregation level of the second control channel, a quantity of symbols included in a first slot, a slot number of the first slot, and a symbol number of a symbol that carries the first demodulation reference sequence and that is in the first slot may include the following step:

The first terminal apparatus determines that the initial value of the first demodulation reference sequence satisfies:

$$c_{init} = (2^{17}(N_{symb}^{slot} n_{s,f}^{m} + l + 1) + k) \mod(2^{31}),$$

where $c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, k is the aggregation level of the second control channel, and an operator mod represents a modulo operation.

Optionally, that the first terminal apparatus determines the initial value of the first demodulation reference sequence based on the aggregation level of the second control channel, a quantity of symbols included in a first slot, a slot number of the first slot, and a symbol number of a symbol that carries the first demodulation reference sequence and that is in the first slot may include the following step:

The first terminal apparatus determines that the initial value of the first demodulation reference sequence satisfies:

$$c_{init} = (2^{17}(N_{symb}^{slot} n_{s,f}^{m} + l + 1) + i) \mod(2^{31}),$$

where $c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, i is the index value of the aggregation level of the second control channel, and an operator mod represents a modulo operation.

For example, the demodulation reference sequence may be a ZC sequence, or may be a PN sequence, or may be an orthogonal sequence of another type. A plurality of demodulation reference sequences in the foregoing demodulation reference sequence set may all be generated based on initial values that are in a one-to-one correspondence with the plurality of demodulation reference sequences. In other words, provided that an initial value is determined, a unique demodulation reference sequence corresponding to the initial value may be generated according to the preset method for generating a demodulation reference sequence. For the method for generating the ZC sequence and PN sequence, refer to an existing implementation. Details are not described again in this embodiment of this application.

It should be noted that, because the first control channel has a fixed code rate, the lengths, of the demodulation reference sequences, used to indicate the different aggregation levels of the second control channel in FIG. 4 are the same.

S302: The first terminal apparatus sends the first control channel, the second control channel, and the data channel to a second terminal apparatus in the first slot.

Correspondingly, the second terminal apparatus performs the following steps.

S303: The second terminal apparatus receives the first control channel from the first terminal apparatus in the first slot.

For content carried on the first control channel, the second control channel, and the data channel, refer to S301. Details are not described herein again.

For example, the first terminal apparatus and the second terminal apparatus may complete transmission of the first control channel, the second control channel, and the data channel in the first slot on a sidelink between the first terminal apparatus and the second terminal apparatus. For details, refer to an existing implementation. Details are not described herein again.

S304: The second terminal apparatus determines the aggregation level of the second control channel based on the first demodulation reference sequence.

In a possible design method, that the second terminal apparatus determines the aggregation level of the second control channel based on the first demodulation reference sequence in S304 may include the following steps: Step 3: The second terminal apparatus determines the initial value of the first demodulation reference sequence. Step 4: The second terminal apparatus determines the aggregation level of the second control channel based on the initial value of the first demodulation reference sequence.

Optionally, the second terminal apparatus may determine the initial value of the first demodulation reference sequence in a blind detection manner. Specifically, the following step A to step C may be included.

Step A: The second terminal apparatus determines a first candidate initial value set based on a first candidate aggregation level set.

The first candidate initial value set includes one or more candidate initial values of the first demodulation reference sequence, and the first candidate aggregation level set includes one or more candidate aggregation levels of the second control channel.

For example, as shown in Table 1, it is assumed that the first candidate aggregation level set includes two candidate aggregation levels whose values are 1 and 4, and the two candidate aggregation levels are substituted into the following formula, to determine corresponding candidate initial values:

$$c_{init} = (2^{17}(N_{symb}^{slot}n_{s,f}^m + l + 1) + k) \bmod (2^{31}),$$

where
  $c_{init}$ is the initial value of the first demodulation reference sequence, $N_{symb}^{slot}$ is the quantity of symbols included in the first slot, $n_{s,f}^m$ is the slot number of the first slot, l is the symbol number of the symbol that carries the first demodulation reference sequence and that is in the first slot, k is the aggregation level of the second control channel, and an operator mod represents a modulo operation.

Specifically, after the first terminal apparatus and the second terminal apparatus complete synchronization, $N_{symb}^{slot}$, $n_{s,f}^m$, and l in the foregoing formula may all be obtained, so that a candidate initial value corresponding to each candidate aggregation level may be determined. Usually, l may include a plurality of optional symbol number combinations. For example, it is assumed that symbols 0, 4, 7, and 11 in a slot carry the first demodulation reference sequence, that is, l has four values. Therefore, one candidate aggregation level corresponds to four candidate initial values.

Step B: The second terminal apparatus generates a first candidate demodulation reference sequence set based on the first candidate initial value set.

The first candidate demodulation reference sequence set includes one or more candidate demodulation reference sequences of the first demodulation reference sequence.

For example, the second terminal apparatus may determine each candidate initial value in the first candidate initial value set by using the foregoing step A, and generate, according to a first preset method, for example, the method for generating the ZC sequence and PN sequence, one or more first candidate demodulation reference sequences corresponding to each candidate initial value. Because a demodulation reference sequence is in a one-to-one correspondence with an initial value of the demodulation reference sequence, correspondingly, one candidate aggregation level may correspond to a plurality of demodulation reference sequences.

It should be noted that, the first candidate demodulation reference sequence generated by the second terminal apparatus as a receiver is also referred to as a local demodulation reference sequence, and is usually a conjugate complex number of the first demodulation reference sequence sent by the first terminal apparatus as a sender.

Step C: The second terminal apparatus performs demodulation and decoding on the first control channel by using each candidate demodulation reference sequence in the first candidate demodulation reference sequence set, determines, as the first demodulation reference sequence, a candidate demodulation reference sequence that is in the first candidate demodulation reference sequence set and that can be used to successfully perform demodulation and decoding on the first control channel to obtain first control information, and determines a candidate initial value corresponding to the first demodulation reference sequence as the initial value of the first demodulation reference sequence.

The first control information may usually include a demodulation reference configuration of the second control channel, for example, a resource configuration and a modulation and coding scheme (MCS) of the second control channel, and/or a demodulation reference configuration of the data channel, for example, a resource configuration and an MCS of the data channel.

For example, the second terminal apparatus may attempt, by using each candidate demodulation reference sequence generated above, to perform channel estimation and demodulation and decoding on the first control channel. It is assumed that a plurality of candidate demodulation reference sequences respectively corresponding to a plurality of candidate initial values corresponding to an aggregation level can be used to correctly perform demodulation and decoding on the first control channel. In this case, it is blindly detected that, an associate conjugate sequence of the candidate demodulation reference sequence is the first demodulation reference sequence, and a candidate initial value corresponding to the candidate demodulation reference sequence is the initial value of the first demodulation reference sequence, and values of $N_{symb}^{slot}$, $n_{s,f}^m$, and l in the formula in step A may also be determined.

Optionally, that the second terminal apparatus determines the aggregation level of the second control channel based on the initial value of the first demodulation reference sequence in step 4 may include the following step:

The second terminal apparatus determines the aggregation level of the second control channel based on the initial value of the first demodulation reference sequence, the quantity of symbols included in the first slot, the slot number of the first slot, and the symbol number of the symbol that carries the first demodulation reference sequence and that is in the first slot.

For example, the aggregation level of the second control channel is in a one-to-one correspondence with the index value of the aggregation level of the second control channel.

Optionally, that the second terminal apparatus determines the aggregation level of the second control channel based on the initial value of the first demodulation reference sequence, the quantity of symbols included in the first slot, the slot number of the first slot, and the symbol number of the symbol that carries the first demodulation reference sequence and that is in the first slot, where the initial value, the quantity, the slot number, and the symbol number are determined in the foregoing step C may include the following step:

The second terminal apparatus determines that the aggregation level of the second control channel satisfies:

$$c_{init} = (2^{17}(N_{symb}^{slot}n_{s,f}^m + l + 1) + k) \bmod (2^{31}),$$

where
  $c_{init}$ is the initial value of the first demodulation reference sequence, $N_{symb}^{slot}$ is the quantity of symbols included in the first slot, $n_{s,f}^m$ is the slot number of the first slot, l is the symbol number of the symbol that carries the first demodulation reference sequence and that is in the first slot, k is the aggregation level of the second control channel, and an operator mod represents a modulo operation.

Similarly, optionally, that the second terminal apparatus determines the aggregation level of the second control channel based on the initial value of the first demodulation reference sequence, the quantity of symbols included in the first slot, the slot number of the first slot, and the symbol number of the symbol that carries the first demodulation reference sequence and that is in the first slot may include: The second terminal apparatus determines that the index value of the aggregation level of the second control channel satisfies:

$$c_{init}=(2^{17}(N_{symb}^{slot}n_{s,f}^{m}+l+1)+i)\mod(2^{31}), \text{ where}$$

$c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, i is the index value of the aggregation level of the second control channel, and an operator mod represents a modulo operation.

S305: The second terminal apparatus receives the second control channel from the first terminal apparatus in the first slot based on the aggregation level of the second control channel.

The first control information carried on the first control channel and the second control information carried on the second control channel are used to demodulate the data channel.

For example, the second terminal apparatus performs channel estimation and demodulation and decoding on the second control channel based on a resource size of the first control channel and a resource size of the second control channel, to obtain the second control information. The second control information may usually include a demodulation reference configuration, a resource size, and an MCS of the data channel.

S306: The second terminal apparatus receives the data channel from the first terminal apparatus in the first slot based on the first control information and the second control information.

For example, the second terminal apparatus may perform channel estimation and demodulation and decoding on the data channel based on the first control information and the second control information, for example, the demodulation reference configuration of the data channel, such as the resource size and the modulation and coding scheme of the data channel, to obtain user data carried on the data channel. For specific implementation, refer to an existing implementation. Details are not described herein again.

According to the communication method shown in FIG. 3, the first terminal apparatus can generate, based on the aggregation level of the second control channel, the first demodulation reference sequence used to demodulate the first control channel, that is, can implicitly transmit the aggregation level of the second control channel. When detecting the first demodulation reference sequence, the second terminal apparatus can learn of the aggregation level of the second control channel. The first terminal apparatus does not need to separately send indication information such as the aggregation level of the second control channel to the second terminal apparatus. In this way, a quantity of pieces of indication information that needs to be transmitted and a quantity of resources occupied by the indication information can be reduced, thereby improving communication efficiency.

Figure 6:
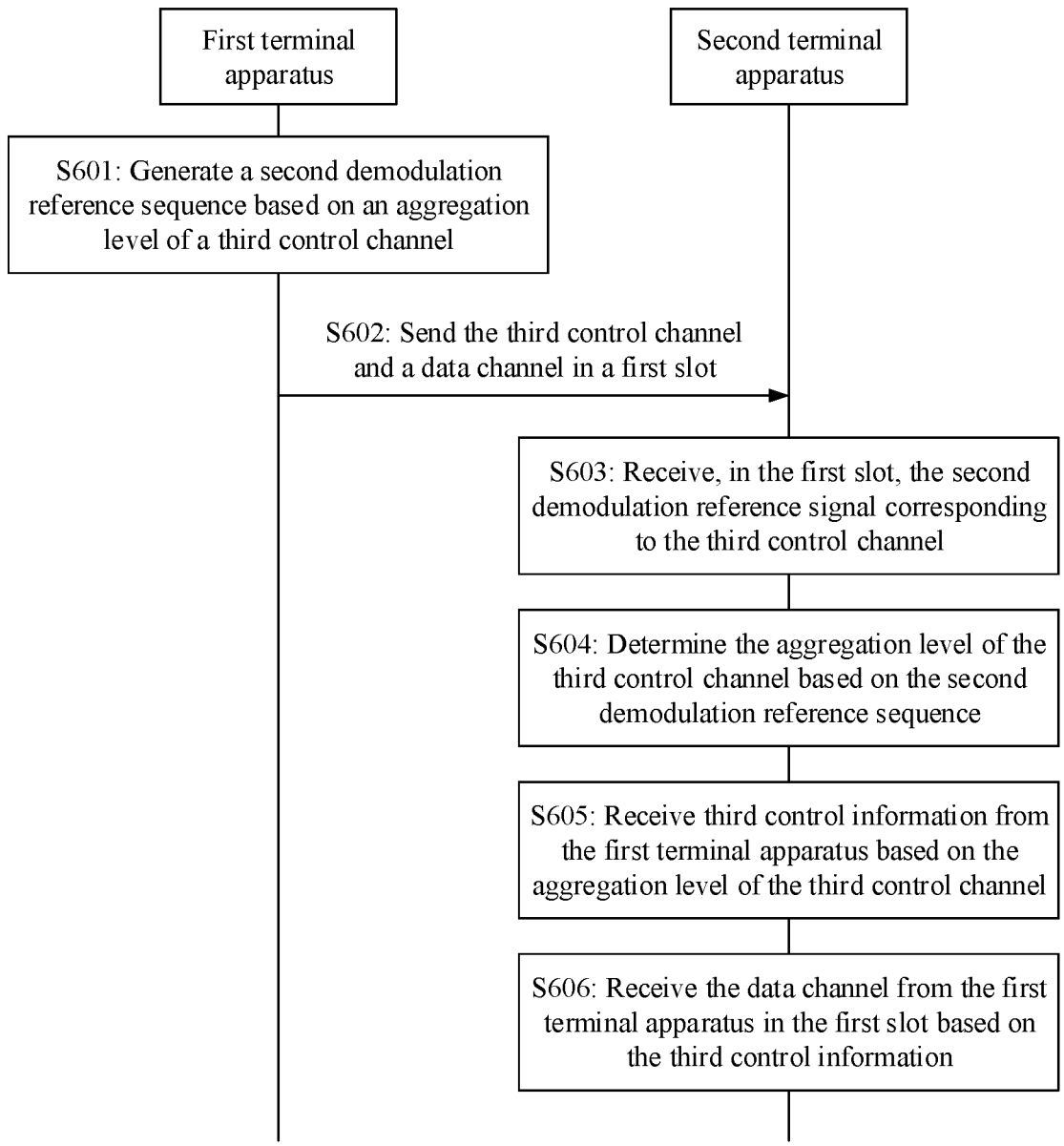
FIG. 6 is a second schematic flowchart of a communication method according to an embodiment of this application.

The communication method shown in FIG. 3 is an example of using a demodulation reference sequence of a control channel to implicitly indicate an aggregation level of another control channel. Actually, a demodulation reference sequence of a control channel may alternatively be used to implicitly indicate an aggregation level that is of a control information and that is carried on the control channel. For example, FIG. 6 is a schematic flowchart of another communication method according to an embodiment of this application. The communication method may be used in communication between the terminal apparatuses shown in FIG. 1. As shown in FIG. 6, the communication method includes the following steps.

S601: A first terminal apparatus generates a second demodulation reference sequence based on an aggregation level of a third control channel.

The second demodulation reference sequence is used to demodulate the third control channel, a second demodulation reference signal generated based on the second demodulation reference sequence is mapped to the third control channel, and third control information carried on the third control channel is used to demodulate a data channel.

It should be noted that the third control information is single stage control information scheduled in one data transmission process. The data channel is a data channel (associated) associated with the third control information. Physically, the data channel and the third control information that are associated are usually located in a same slot.

For example, the third control channel may be the foregoing first-stage control channel (the first control channel), or may be the foregoing second-stage control channel (the second control channel). This is not limited in this embodiment of this application.

In a possible design method, that a first terminal apparatus generates a second demodulation reference sequence based on an aggregation level of a third control channel in S601 may include the following steps: Step 5: The first terminal apparatus determines an initial value of the second demodulation reference sequence based on the aggregation level of the third control channel. Step 6: The first terminal apparatus generates the second demodulation reference sequence based on the initial value of the second demodulation reference sequence.

Optionally, that the first terminal apparatus determines an initial value of the second demodulation reference sequence based on the aggregation level of the third control channel may include the following step:

The first terminal apparatus determines the initial value of the second demodulation reference sequence based on the aggregation level of the third control channel, a quantity of symbols included in a first slot, a slot number of the first slot, and a symbol number of a symbol that carries the second demodulation reference sequence and that is in the first slot.

For example, the aggregation level of the third control channel is in a one-to-one correspondence with an index value of the aggregation level of the third control channel.

Optionally, that the first terminal apparatus determines the initial value of the second demodulation reference sequence based on the aggregation level of the third control channel, a quantity of symbols included in a first slot, a slot number of the first slot, and a symbol number of a symbol that carries the second demodulation reference sequence and that is in the first slot may include the following step:

The first terminal apparatus determines that the initial value of the second demodulation reference sequence satisfies:

$$c_{init}=(2^{17}(N_{symb}^{slot}n_{s,f}^{m}+l+1)+k)\bmod(2^{31}), \text{ where}$$

$c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, k is the aggregation level of the third control channel, and an operator mod represents a modulo operation.

Optionally, that the first terminal apparatus determines the initial value of the second demodulation reference sequence based on the aggregation level of the third control channel, a quantity of symbols included in a first slot, a slot number of the first slot, and a symbol number of a symbol that carries the second demodulation reference sequence and that is in the first slot may include the following step:

The first terminal apparatus determines that the initial value of the second demodulation reference sequence satisfies:

$$c_{init}=(2^{17}(N_{symb}^{slot}n_{s,f}^{m}+l+1)+i)\bmod(2^{31}), \text{ where}$$

$c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, i is the index value of the aggregation level of the third control channel, and an operator mod represents a modulo operation.

It should be noted that, for specific implementation of the foregoing step 5 and step 6, refer to the foregoing step 3 and step 4 respectively. Implementation methods are the same. Differences are only as follows:

Difference 1: In step 3 and step 4, the demodulation reference sequence (the first demodulation reference sequence) of the first control channel implicitly carries the aggregation level of the second control channel, that is, the aggregation level and the demodulation reference sequence respectively belong to two stage different control channels. However, in step 5 and step 6, the demodulation reference sequence (the second demodulation reference sequence) of the third control channel implicitly carries the aggregation level that is of the third control channel and that is carried on the third control channel, that is, both the aggregation level and the demodulation reference sequence belong to a same control channel.

Difference 2: In step 3 and step 4, because the first demodulation reference sequence is the demodulation reference sequence of the first control channel, a length of the first demodulation reference sequence is associated only with the resource size of the first control channel. In other words, for the different aggregation levels of the second control channel, lengths of the first demodulation reference sequence are the same, and the aggregation level of the second control channel is used only to determine the initial value of the first demodulation reference sequence, and further determine which candidate demodulation reference sequence in the first candidate demodulation reference sequence set is the first demodulation reference sequence, that is, determine content of the first demodulation reference sequence.

However, in step 5 and step 6, the second demodulation reference sequence is a demodulation reference sequence of the third control channel, and both a length and content of the second demodulation reference sequence are determined based on the aggregation level that is of the third control channel and that is carried on the third control channel. Specifically, the aggregation level of the third control channel determines a resource size of the third control channel and the initial value of the second demodulation reference sequence, the resource size of the third control channel determines the length of the second demodulation reference sequence, and the initial value of the second demodulation reference sequence determines which demodulation reference sequence is the second demodulation reference sequence.

Figure 7:
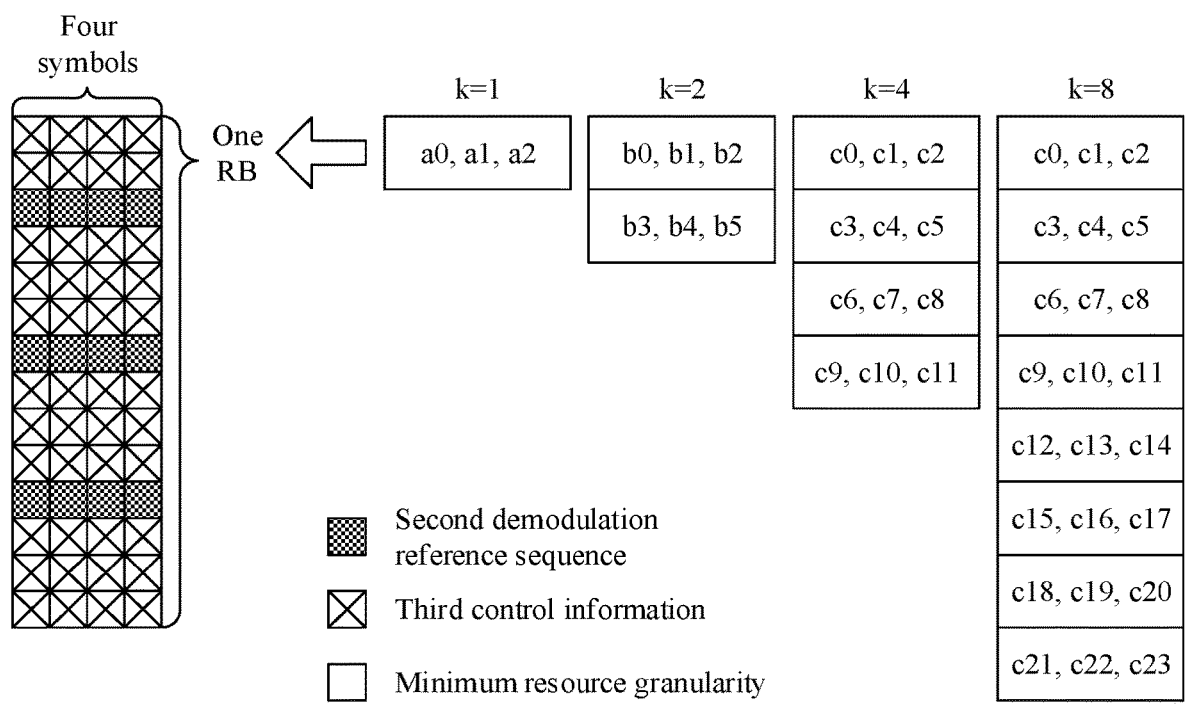
FIG. 7 is a schematic diagram of a correspondence between an aggregation level of a third control channel and a second demodulation reference sequence according to an embodiment of this application.

For example, FIG. 7 is a schematic diagram of a correspondence between an aggregation level of a third control channel and a second demodulation reference sequence according to an embodiment of this application. It is assumed that on each minimum mapping unit of the third control channel, a mapping position of the second demodulation reference sequence is fixed relative to a mapping position of the third control information, in other words, density of the demodulation reference sequence is fixed, and a relative start position, on each RB, of the second demodulation reference sequence is fixed. When the third control channel uses different aggregation levels, time-frequency resources corresponding to the third control channel as a whole are in a multiple relationship. In other words, when the aggregation level increases by times, a corresponding length of the second demodulation reference sequence also increases by the same times.

For example, as shown in FIG. 7, one RB includes 12 REs in total, and corresponding RE numbers are sequentially 0 to 11. Three REs, namely, three REs numbered 3, 7, and 11 are used to carry a second demodulation reference sequence. In this case, for a third control channel whose minimum resource granularity is one RB, when an aggregation level k=1, a length of a second demodulation reference sequence is 3, and a corresponding sequence is {a0, a1, . . . , a2}; when the aggregation level k=2, the length of the second demodulation reference sequence is 6, and the corresponding sequence is {b0, b1, . . . , b5}; when the aggregation level k=4, the length of the second demodulation reference sequence is 12, and the corresponding sequence is {c0, c1, . . . , c11}; and when the aggregation level k=8, the length of the second demodulation reference sequence is 24, and the corresponding sequence is {d0, d1, . . . , d23}.

It should be noted that, in addition to the aggregation level of the third control channel, the second demodulation reference sequence may further implicitly indicate another parameter, for example, a control information format. Different control information formats may be control information formats for service types such as unicast, multicast, and broadcast, to perform transmission of different services such as a unicast service, a multicast service, and a broadcast service. Therefore, optionally, the first terminal apparatus may alternatively calculate the initial value of the second demodulation reference sequence based on an index value of the control information format of the third control channel, for example, perform the calculation by substituting the index value of the control information format of the third control channel into the foregoing calculation formula of the initial value of the second demodulation reference sequence, to generate the second demodulation reference sequence and map the second demodulation reference sequence onto the third control channel for sending. In this way, implicit transmission of the control information format of the third control channel is performed. The control information format of the third control channel is in a one-to-one correspondence with the index value of the control information format of the third control channel. The correspondence may be preconfigured by a network, or may be dynamically configured by a base station side through signaling. This is not limited in this embodiment of this application.

S602: The first terminal apparatus sends the third control channel and the data channel to a second terminal apparatus in the first slot.

For example, the first terminal apparatus may send transmission of the third control channel and the data channel to the second terminal apparatus in the first slot through a sidelink between the first terminal apparatus and the second terminal apparatus. For details, refer to an existing implementation. Details are not described herein again.

Correspondingly, the second terminal apparatus performs the following steps.

S603: The second terminal apparatus receives, from the first terminal apparatus in the first slot, the second demodulation reference signal corresponding to the third control channel.

The second demodulation reference sequence for generating the second demodulation reference signal is used to demodulate third control information carried on the third control channel, and the third control information is used to demodulate the data channel.

Specifically, that the second terminal apparatus receives, from the first terminal apparatus in the first slot, the second demodulation reference signal corresponding to the third control channel in S603 may include: The second terminal apparatus may determine, in a blind detection manner, the second demodulation reference sequence for generating the second demodulation reference signal, and the initial value of the second demodulation reference sequence.

For example, the second terminal apparatus may perform correlation detection between the second demodulation reference signal and a plurality of candidate demodulation reference sequences in a second candidate demodulation reference sequence set, and determine, as the second demodulation reference sequence and the initial value, a candidate demodulation reference sequence and an initial value that correspond to a maximum correlation value. The second candidate demodulation reference sequence set may be a set including candidate demodulation reference sequences corresponding to one or more candidate aggregation levels in a second candidate aggregation level set, and the second candidate aggregation level set is a set including candidate aggregation levels of the third control channel. For example, the second candidate demodulation reference sequence set may include a plurality of candidate demodulation reference sequences, and each of the plurality of candidate demodulation reference sequences corresponds to one initial value.

In a possible implementation, the second terminal apparatus calculates, according to the following formula, an average correlation value corresponding to each candidate demodulation reference sequence in the second candidate demodulation reference sequence set:

$$c = \frac{1}{N}\sum_{n=0}^{N-1} \|h_n * h_{n,k}\|^2,$$

where
c is an average correlation value of a first candidate demodulation reference sequence, the first candidate demodulation reference sequence is any candidate demodulation reference sequence in the second candidate demodulation reference sequence set, $h_n$ is a received signal of the third control channel, $h_{n,k}$ is the first candidate demodulation reference sequence, k is a candidate aggregation level corresponding to the first candidate demodulation reference sequence in the second candidate aggregation level set, $h_{n,k}$ is a conjugate complex number of $h_n$, 0≤n<N−1, and N is a sequence length of $h_{n,k}$.

In another possible implementation, the second terminal apparatus calculates, according to the following formula, an average correlation value corresponding to each candidate demodulation reference sequence in the second candidate demodulation reference sequence set:

$$c = \frac{1}{N}\sum_{n=0}^{N-1} \|h_n * h_{n,i}\|^2,$$

where
c is an average correlation value of a first candidate demodulation reference sequence, the first candidate demodulation reference sequence is any candidate demodulation reference sequence in the second candidate demodulation reference sequence set, $h_n$ is a received signal of the third control channel, $h_{n,i}$ is the first candidate demodulation reference sequence, i is an index value of a candidate aggregation level corresponding to the first candidate demodulation reference sequence in the second candidate aggregation level set, $h_{n,i}$ is a conjugate complex number of $h_n$, 0≤n<N−1, and N is a sequence length of $h_{n,i}$.

To further improve blind detection accuracy, correlation consistency decision may also be introduced. Specifically, the average correlation value may include a first average correlation value and a second average correlation value. The first average correlation value is an average correlation value on a first resource scheduling unit, the second average correlation value is an average correlation value on a second resource scheduling unit, and the first resource scheduling unit and the second resource scheduling unit may be consecutive or inconsecutive in frequency domain. Correspondingly, that the second terminal apparatus determines the initial value of the second demodulation reference sequence may further include: If a ratio of the first average correlation value to the second average correlation value is greater than a first ratio threshold and less than a second ratio threshold, the second terminal apparatus determines that correlation of the first resource scheduling unit is consistent with correlation of the second resource scheduling unit. The first ratio threshold is usually less than the second ratio threshold. For example, the first ratio threshold may be 0.1, and the second ratio threshold may be 10. In other words, when the first average correlation value and the second average correlation value are of a same order of magnitude, it is considered that the correlation of the first resource scheduling unit is consistent with the correlation of the second resource scheduling unit.

It is easy to understand that, if a ratio of the first average correlation value to the second average correlation value is less than a first ratio threshold or greater than a second ratio threshold, the second terminal apparatus determines that correlation of the first resource scheduling unit is inconsistent with correlation of the second resource scheduling unit. In this case, the second terminal apparatus may determine, as the second demodulation reference sequence, a candidate demodulation reference sequence corresponding to a larger one of the first average correlation value and the second average correlation value.

S604: The second terminal apparatus determines the aggregation level of the third control channel based on the second demodulation reference sequence.

In a possible design method, that the second terminal apparatus determines the aggregation level of the third control channel based on the second demodulation reference sequence in S604 may include the following step: The second terminal apparatus determines the aggregation level of the third control channel based on the initial value of the second demodulation reference sequence.

Specifically, that the second terminal apparatus determines the aggregation level of the third control channel based on the initial value of the second demodulation reference sequence may include: The second terminal apparatus determines the aggregation level of the third control channel based on the initial value of the second demodulation reference sequence, a quantity of symbols included in the first slot, a slot number of the first slot, and a symbol number of a symbol that carries the second demodulation reference sequence and that is in the first slot. The aggregation level of the third control channel is in a one-to-one correspondence with an index value of the aggregation level of the third control channel.

In a possible implementation, that the second terminal apparatus determines the aggregation level of the third control channel based on the initial value of the second demodulation reference sequence, a quantity of symbols included in the first slot, a slot number of the first slot, and a symbol number of a symbol that carries the second demodulation reference sequence and that is in the first slot may include:

The second terminal apparatus determines that the aggregation level of the third control channel satisfies:

$c_{init}=(2^{17}(N_{symb}^{slot}n_{s,f}^{m}+l+1)+k)\bmod(2^{31})$, where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, k is the aggregation level of the third control channel, and an operator mod represents a modulo operation.

In another possible implementation, that the second terminal apparatus determines the aggregation level of the third control channel based on the initial value of the second demodulation reference sequence, a quantity of symbols included in the first slot, a slot number of the first slot, and a symbol number of a symbol that carries the second demodulation reference sequence and that is in the first slot may include:

The second terminal apparatus determines that the index value of the aggregation level of the third control channel satisfies:

$$c_{init} = (2^{17}(N_{symb}^{slot}n_{s,f}^{m} + l + 1) + i)\bmod(2^{31}),$$

where $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, i is the index value of the aggregation level of the third control channel, and an operator mod represents a modulo operation.

S605: The second terminal apparatus receives the third control information from the first terminal apparatus based on the aggregation level of the third control channel.

For example, the second terminal apparatus obtains the resource size of the third control channel based on the aggregation level of the third control channel, and receives and demodulates, based on the resource size of the third control channel, the third control information carried on the third control channel.

S606: The second terminal apparatus receives the data channel from the first terminal apparatus in the first slot based on the third control information.

For example, the third control information may usually include a demodulation reference configuration, a resource size, an MCS of the data channel, and the like. The second terminal apparatus receives and demodulates, in the first slot, the data channel based on the demodulation reference configuration, the resource size, the MCS, and the like of the data channel, to obtain user data carried on the data channel.

It should be noted that, in addition to the aggregation level of the third control channel, the second demodulation reference sequence may further implicitly indicate another parameter, for example, a control information format. Different control information formats may be control information formats for service types such as unicast, multicast, and broadcast, so as to perform transmission of different services such as a unicast service, a multicast service, and a broadcast service. Therefore, optionally, the second terminal apparatus may alternatively determine the second demodulation reference sequence and the initial value of the second demodulation reference sequence based on a blind detection result of the demodulation reference sequence, to determine an index value of the control information format of the third control channel corresponding to the second demodulation reference sequence, and further obtain the control information format of the third control channel. In this way, implicit transmission of the control information format of the third control channel is performed. The control information format of the third control channel is in a one-to-one correspondence with the index value of the control information format of the third control channel. The correspondence may be preconfigured by a network, or may be dynamically configured by a base station side through signaling. This is not limited in this embodiment of this application.

According to the communication method shown in FIG. 6, the first terminal apparatus can generate, based on the aggregation level of the third control channel, the second demodulation reference sequence used to demodulate the third control channel, that is, can implicitly transmit the aggregation level of the third control channel. When detecting the second demodulation reference sequence, the second terminal apparatus can simultaneously learn of the aggregation level of the third control channel. The first terminal apparatus does not need to separately send indication information such as the aggregation level of the third control channel to the second terminal apparatus. In this way, a quantity of pieces of indication information that needs to be transmitted and a quantity of resources occupied by the indication information can be reduced, thereby improving communication efficiency.

Figure 8:
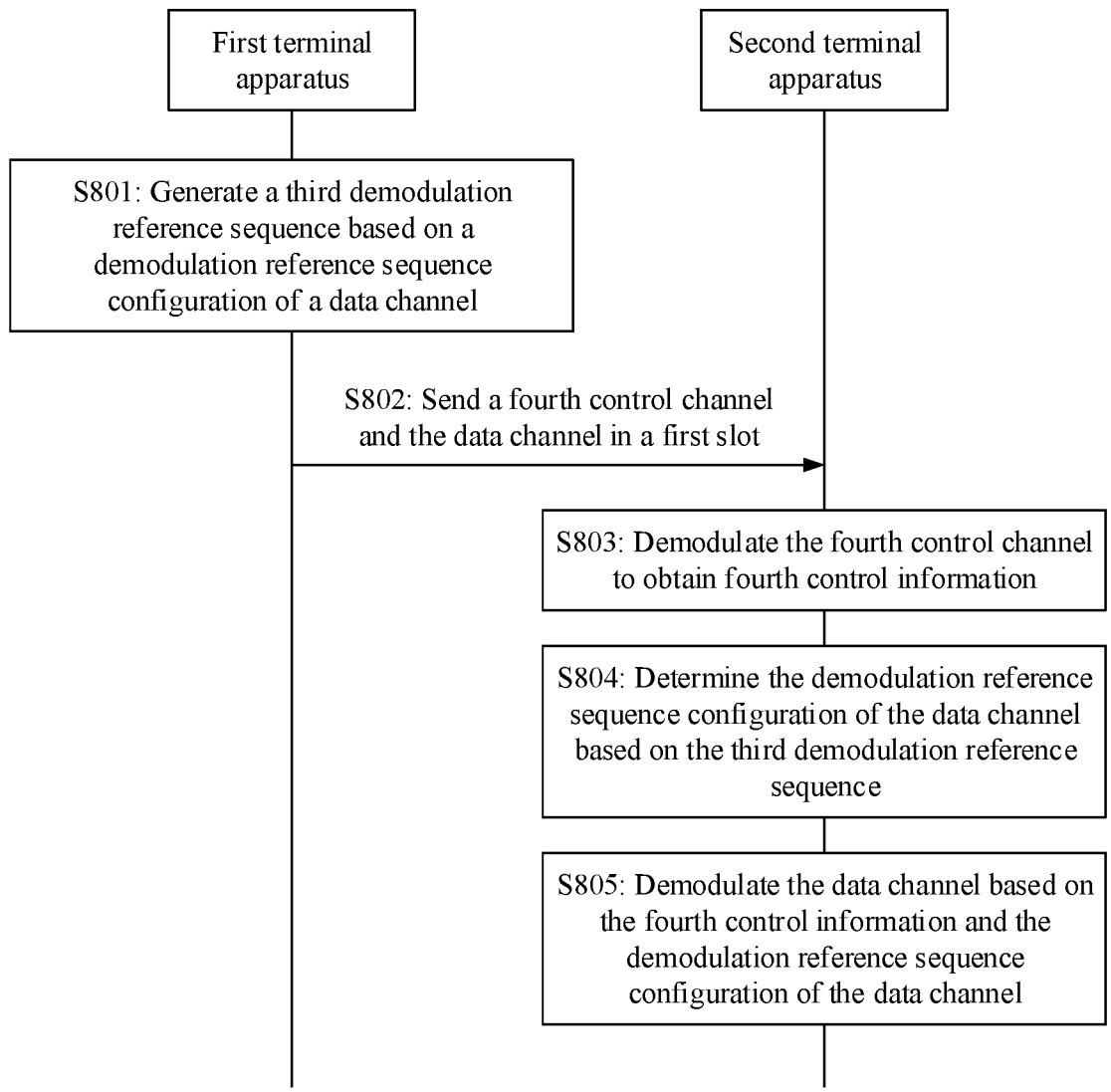
FIG. 8 is a third schematic flowchart of a communication method according to an embodiment of this application.

The communication methods shown in FIG. 3 and FIG. 6 are each an example of using a demodulation reference sequence of a control channel to implicitly indicate an aggregation level of a control channel. Actually, the demodulation reference sequence of the control channel may also be used to implicitly indicate a demodulation reference sequence configuration of the data channel. FIG. 8 is a schematic flowchart of still another communication method according to an embodiment of this application. The communication method may be used in communication between the terminal apparatuses shown in FIG. 1. As shown in FIG. 8, the communication method includes the following steps.

S801: A first terminal apparatus generates a third demodulation reference sequence based on a demodulation reference sequence configuration of a data channel.

The third demodulation reference sequence is used to demodulate a fourth control channel, and fourth control information carried on the fourth control channel is used to demodulate the data channel.

It should be noted that the fourth control information is single stage control information scheduled in one data transmission process. The data channel is a data channel (associated) associated with the fourth control information. Physically, the data channel and the fourth control information that are associated are usually located in a same slot.

In a possible design method, that a first terminal apparatus generates a third demodulation reference sequence based on a demodulation reference sequence configuration of a data channel in S801 may include the following steps:

The first terminal apparatus determines an initial value of the third demodulation reference sequence based on the demodulation reference sequence configuration of the data channel. Then, the first terminal apparatus generates the third demodulation reference sequence based on the initial value of the third demodulation reference sequence.

Optionally, that the first terminal apparatus determines an initial value of the third demodulation reference sequence based on the demodulation reference sequence configuration of the data channel may include:

The first terminal apparatus determines the initial value of the third demodulation reference sequence based on the demodulation reference sequence configuration of the data channel, a quantity of symbols included in a first slot, a slot number of the first slot, and a symbol number of a symbol that carries the third demodulation reference sequence and that is in the first slot.

For example, the demodulation reference sequence configuration of the data channel includes any one of the following: a frequency domain pattern, a time domain pattern, or a time-frequency pattern of a demodulation reference sequence of the data channel. The frequency domain pattern of the demodulation reference sequence of the data channel is in a one-to-one correspondence with an index of the frequency domain pattern of the demodulation reference sequence of the data channel. The time domain pattern of the demodulation reference sequence of the data channel is in a one-to-one correspondence with an index of the time domain pattern of the demodulation reference sequence of the data channel. The time-frequency pattern of the demodulation reference sequence of the data channel is in a one-to-one correspondence with an index of the time-frequency pattern of the demodulation reference sequence of the data channel.

Figure 9:
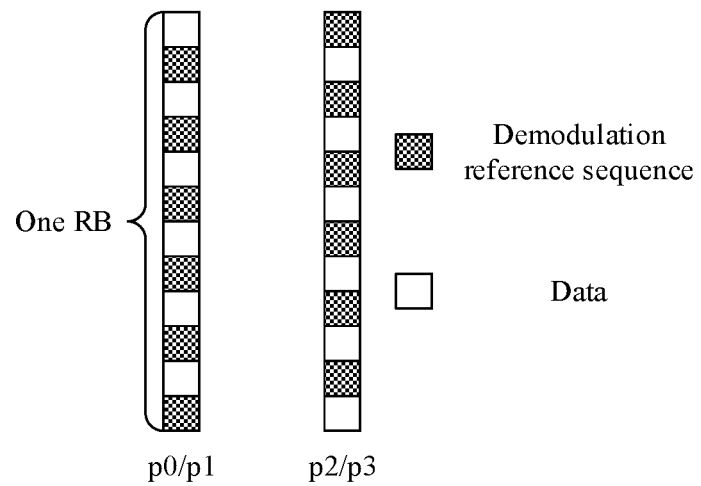
FIG. 9 is a first schematic diagram of a frequency domain pattern of a demodulation reference sequence of a data channel according to an embodiment of this application.

For example, FIG. 9 is a schematic diagram of a frequency domain pattern 1 of a demodulation reference sequence of a data channel according to an embodiment of this application. The following uses one RB as an example for description. The RB includes 12 REs, and it is assumed that the 12 REs are sequentially RE0, RE1, ..., and RE11 from bottom to top. As shown in FIG. 9, the frequency domain pattern 1 is a frequency domain pattern applicable to four antenna ports (port, p), and frequency domain density of a demodulation reference sequence on an antenna port 0/1 (p0/p1) and frequency domain density of the demodulation reference sequence on an antenna port 2/3 (p2/p3) are the same. In other words, the frequency domain density is that each RB has six REs used to carry the demodulation reference sequence, that is, the frequency domain density is 1/2. A difference between the two groups of antenna ports (p0/p1 and p2/p3) lies in that a frequency domain offset (also referred to as a start RE, namely, the $1^{st}$ RE carrying the demodulation reference sequence) of the demodulation reference sequence is different. A frequency domain offset of the antenna port 0/1 is 0, and a frequency domain offset of the antenna port 2/3 is 1.

Figure 10:
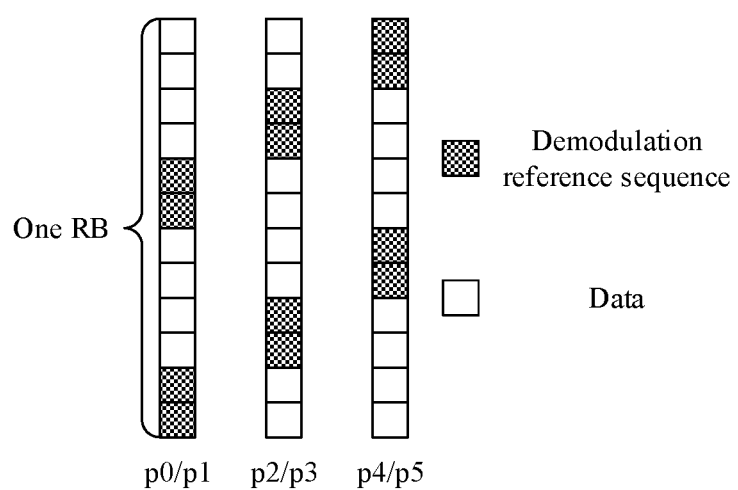
FIG. 10 is a second schematic diagram of a frequency domain pattern of a demodulation reference sequence of a data channel according to an embodiment of this application.

For example, FIG. 10 is a schematic diagram of a frequency domain pattern 2 of a demodulation reference sequence of a data channel according to an embodiment of this application. The following uses one RB as an example for description. The RB includes six RE pairs (REPs), and each REP includes two neighboring REs. It is assumed that the RE pairs are REP0, REP1, ..., and REP5 in sequence from bottom to top. As shown in FIG. 10, the frequency domain pattern 2 is a frequency domain pattern applicable to six antenna ports, frequency domain density of a demodulation reference sequence on an antenna port 0/1 (p0/p1), frequency domain density of the demodulation reference sequence on an antenna port 2/3 (p2/p3), and frequency domain density of the demodulation reference sequence on an antenna port 4/5 (p4/p5) are the same. In other words, the frequency domain density is that each RB has two REPs used to carry the demodulation reference sequence, that is, the frequency domain density is 1/3. A difference between the three groups of antenna ports (p0/p1, p2/p3, and p4/p5) lies in that a frequency domain offset (also referred to as a start REP, namely, a number of the $1^{st}$ REP carrying the demodulation reference sequence) of the demodulation reference sequence is different. For example, a frequency domain offset of the antenna port 0/1 is REP0, a frequency domain offset of the antenna port 2/3 is REP1, and a frequency domain offset of the antenna port 4/5 is REP2.

It should be noted that the frequency domain pattern 1 and the frequency domain pattern 2 are merely two examples of the frequency domain pattern of the demodulation reference sequence of the data channel. Actually, another frequency domain pattern may be further designed based on an actual situation. For example, frequency domain density and a frequency domain offset of the demodulation reference sequence of the data channel may be adjusted based on a channel condition, and/or a frequency domain pattern and the like of each antenna port may be designed for different quantities of antenna ports.

In addition, a unique index value may be further set for each frequency domain pattern, to be specific, a one-to-one correspondence (a first correspondence for short below) between a frequency domain pattern of the demodulation reference sequence of the data channel and an index of the frequency domain pattern of the demodulation reference sequence of the data channel may be set. In other words, a sender may send only the index of the frequency domain pattern, and a receiver may determine the frequency domain pattern of the demodulation reference sequence of the data channel based on the first correspondence locally preconfigured on the receiver and the received index of the frequency domain pattern, to reduce signaling consumption and resource consumption in a process of transmission of the various frequency domain patterns of the demodulation reference sequence of the data channel.

Table 2 shows a correspondence between the frequency domain pattern of the demodulation reference sequence of the data channel and the index of the frequency domain pattern of the demodulation reference sequence of the data channel according to this embodiment of this application. As shown in Table 2, the frequency domain pattern 1 and the frequency domain pattern 2 of the demodulation reference sequence of the data channel respectively correspond to an index value 0 and an index value 1 of the index of the frequency domain pattern of the demodulation reference sequence of the data channel.

It should be noted that the frequency domain pattern 1 and the frequency domain pattern 2 specify only a frequency domain resource position of the demodulation reference sequence of the data channel on a specified antenna port, and do not relate to a time domain resource position of the demodulation reference sequence of the data channel, for example, which symbols in a slot carry the demodulation reference sequence of the data channel, and/or whether symbols that carry the demodulation reference sequence of the data channel in different slots are the same. Therefore, this embodiment of this application further provides several time domain patterns of the demodulation reference sequence of the data channel, to determine a time domain position of the demodulation reference sequence of the data channel. Detailed descriptions are provided below.

TABLE 2

| Index of the frequency domain pattern | Frequency domain pattern |
|---|---|
| 0 | Frequency domain pattern 1 |
| 1 | Frequency domain pattern 2 |

Figure 11:
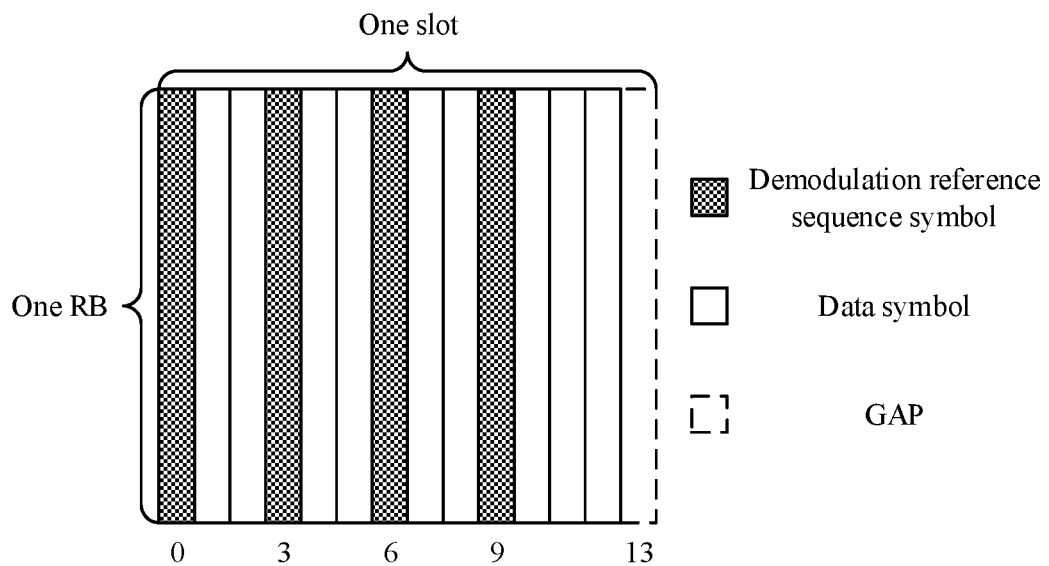
FIG. 11 is a first schematic diagram of a time domain pattern of a demodulation reference sequence of a data channel according to an embodiment of this application.

For example, FIG. 11 is a schematic diagram of a time domain pattern 1 of a demodulation reference sequence of a data channel according to an embodiment of this application. The following uses one slot as an example for description. The slot includes 14 symbols, and the 14 symbols are sequentially a symbol 0, a symbol 1, ..., and a symbol 13 in a chronological order. The symbol 13 is a guard interval, is used for receive/transmit transition on a sidelink, radio frequency circuit switching, or the like, and is not used for transmission of data or signaling. As shown in FIG. 11, the demodulation reference sequence of the data channel may be carried on four symbols: the symbol 0, a symbol 3, a symbol 6, and a symbol 9 in the slot. It is easy to understand that for each of the four symbols, a frequency domain position of the demodulation reference sequence of the data channel may be determined based on the foregoing frequency domain patterns.

Figure 12:
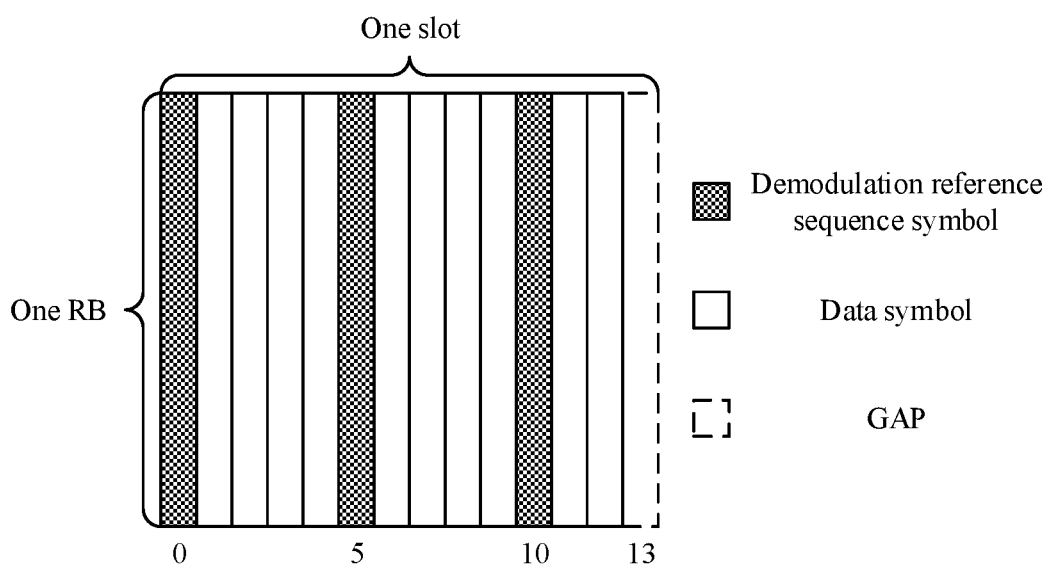
FIG. 12 is a second schematic diagram of a time domain pattern of a demodulation reference sequence of a data channel according to an embodiment of this application.

For example, FIG. 12 is a schematic diagram of a time domain pattern 2 of a demodulation reference sequence of a data channel according to an embodiment of this application. The following uses one slot as an example for description. The slot is the same as the slot shown in FIG. 11. As shown in FIG. 12, the demodulation reference sequence of the data channel may be carried on three symbols: the symbol 0, a symbol 5, and a symbol 10 in the slot. It is easy to understand that for each of the three symbols, a frequency domain position of the demodulation reference sequence of the data channel may be determined based on the foregoing frequency domain patterns.

It should be noted that the time domain pattern 1 and the time domain pattern 2 are merely two examples of the time domain pattern of the demodulation reference sequence of the data channel, and in each of the time domain pattern 1 and the time domain pattern 2, a time domain offset, namely, the $1^{st}$ symbol carrying the demodulation reference sequence of the data channel, is the symbol 0. Actually, another time domain pattern may be further designed based on an actual situation. For example, time domain density and a time domain offset of the demodulation reference sequence of the data channel may be adjusted based on a channel condition, and/or a time domain pattern and the like of each antenna port may be designed for different quantities of antenna ports.

In addition, a unique index of the time domain pattern may be further set for each time domain pattern, to be specific, a one-to-one correspondence (a second correspondence for short below) between a time domain pattern of the demodulation reference sequence of the data channel and an index of the time domain pattern of the demodulation reference sequence of the data channel may be set. In other words, a sender may send only the index of the time domain pattern, and a receiver may determine the time domain pattern of the demodulation reference sequence of the data channel based on the second correspondence locally preconfigured on the receiver and the received index of the time domain pattern, to reduce signaling consumption and resource consumption in a process of transmission of the various time domain patterns of the demodulation reference sequence of the data channel.

Table 3 shows a correspondence between the time domain pattern of the demodulation reference sequence of the data channel and the index of the time domain pattern of the demodulation reference sequence of the data channel according to this embodiment of this application. $l_0$ is a symbol number of the $1^{st}$ symbol that carries the demodulation reference sequence of the data channel in the time domain pattern of the demodulation reference sequence of the data channel, and a value range thereof may be $0 \leq l_0 \leq 12$. As shown in Table 2, when $l_0=0$, the time domain pattern 1 and the time domain pattern 2 of the demodulation reference sequence of the data channel respectively correspond to an index value 2 and an index value 3 of the index of the frequency domain pattern of the demodulation reference sequence of the data channel in Table 3.

It should be noted that the time domain pattern 1 and the time domain pattern 2 specify only a time domain resource position of the demodulation reference sequence of the data channel, and do not relate to a frequency domain resource position of the demodulation reference sequence of the data channel, for example, which REs in an RB carry the demodulation reference sequence of the data channel, whether REs that carry the demodulation reference sequence of the data channel on different ports are the same, a frequency domain offset of the demodulation reference sequence of the data channel, and/or the like. It is easy to understand that the time domain pattern and the frequency domain pattern may be used in combination to jointly determine the time domain position and the frequency domain position that carry the demodulation reference sequence of the data channel. The following provides detailed descriptions.

TABLE 3

| Index of the time domain pattern | Time domain pattern |
| --- | --- |
| 0 | $l_0$ |
| 1 | $l_0, l_0 + 10$ |
| 2 | $l_0, l_0 + 5, l_0 + 10$ |
| 3 | $l_0, l_0 + 3, l_0 + 6, l_0 + 9$ |

Table 4 shows a correspondence (a third correspondence for short below) between the time-frequency pattern of the demodulation reference sequence of the data channel and the index of the time-frequency pattern according to this embodiment of this application. In other words, a sender may send only the index of the time-frequency pattern, and a receiver may determine the time-frequency pattern of the demodulation reference sequence of the data channel based on the third correspondence locally preconfigured on the receiver and the received index of the time-frequency pattern, to reduce signaling consumption and resource consumption in a process of transmission of the various time-frequency patterns of the demodulation reference sequence of the data channel.

Figure 13:
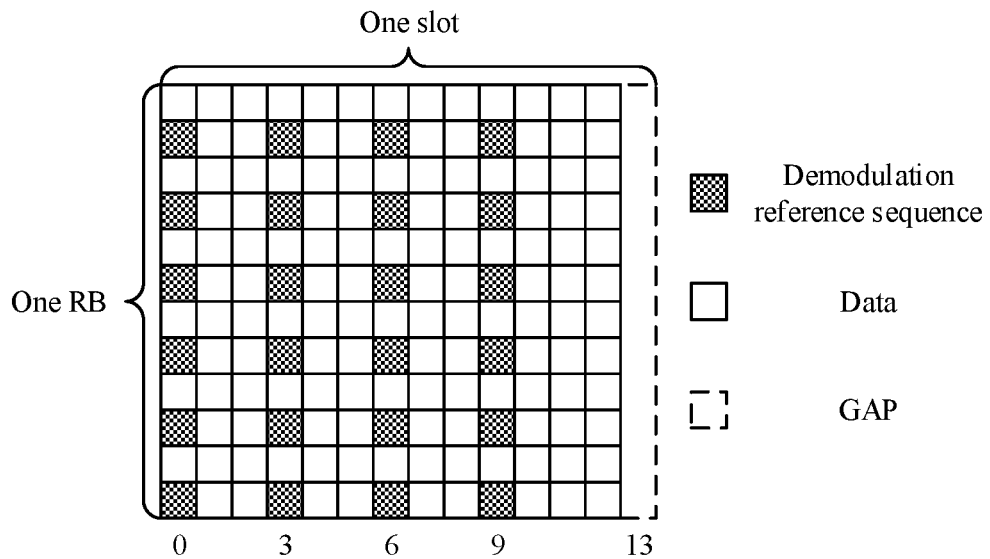
FIG. 13 is a first schematic diagram of a time-frequency pattern of a demodulation reference sequence of a data channel according to an embodiment of this application.
Figure 14:
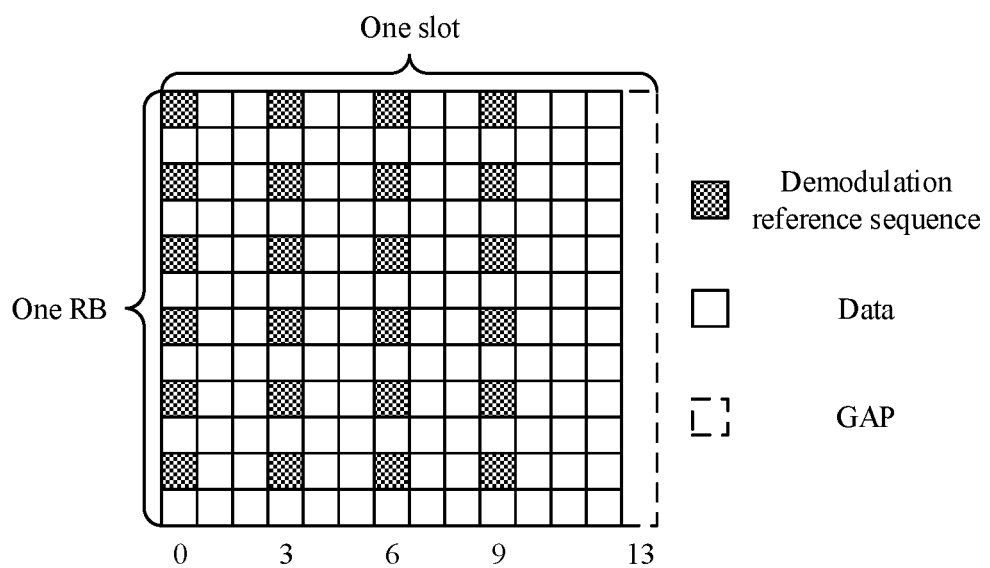
FIG. 14 is a second schematic diagram of a time-frequency pattern of a demodulation reference sequence of a data channel according to an embodiment of this application.

FIG. 13 and FIG. 14 are each a schematic diagram of a time-frequency pattern in a case in which the index of the time-frequency pattern in Table 4 is 3 and $l_0$=0. FIG. 13 is a time-frequency pattern for an antenna port 0/1, and FIG. 14 is a time-frequency pattern for an antenna port 2/3. For example, as shown in FIG. 13, one slot and one RB are used as an example. For the antenna port 0/1, the demodulation reference sequence of the data channel is carried on four symbols: a symbol 0, a symbol 3, a symbol 6, and a symbol 9 in the slot, and is carried on six REs whose RE numbers are even numbers: RE0, RE2, RE4, RE6, RE8, and RE10 in the RB.

For example, as shown in FIG. 14, the foregoing slot and RB are still used as an example. For the antenna port 2/3, the demodulation reference sequence of the data channel is carried on four symbols: the symbol 0, the symbol 3, the symbol 6, and the symbol 9 in the slot, and is carried on six REs whose RE numbers are odd numbers: RE1, RE3, RE5, RE7, RE9, and RE11 in the RB.

It should be noted that the frequency domain pattern and the time domain pattern may be used in combination, as shown by the time-frequency pattern, or may be used independently. This is not limited in this embodiment of this application.

TABLE 4

| Index of the time-frequency pattern | Index of the frequency domain pattern | Index of the time domain pattern | Time domain pattern |
| --- | --- | --- | --- |
| 0 | 0 | 0 | $l_0$ |
| 1 |   | 1 | $l_0, l_0 + 10$ |
| 2 |   | 2 | $l_0, l_0 + 5, l_0 + 10$ |
| 3 |   | 3 | $l_0, l_0 + 3, l_0 + 6, l_0 + 9$ |
| 4 | 1 | 0 | $l_0$ |
| 5 |   | 1 | $l_0, l_0 + 10$ |
| 6 |   | 2 | $l_0, l_0 + 5, l_0 + 10$ |
| 7 |   | 3 | $l_0, l_0 + 3, l_0 + 6, l_0 + 9$ |

Further, the index of the frequency domain pattern, the index of the time domain pattern, and the index of the time-frequency pattern of the demodulation reference sequence of the data channel may be further used to determine content of the demodulation reference sequence of the data channel, namely, the third demodulation reference sequence. In other words, in this embodiment of this application, the index of the frequency domain pattern, the index of the time domain pattern, and the index of the time-frequency pattern of the demodulation reference sequence of the data channel may alternatively not be sent, but the third demodulation reference sequence having a correspondence with the index of the frequency domain pattern, the index of the time domain pattern, or the index of the time-frequency pattern is sent, thereby further reducing signaling consumption and resource consumption. Therefore, optionally, that the first terminal apparatus determines the initial value of the third demodulation reference sequence based on the demodulation reference sequence configuration of the data channel, a quantity of symbols included in a first slot, a slot number of the first slot, and a symbol number of a symbol that carries the third demodulation reference sequence and that is in the first slot may include the following step:

The first terminal apparatus determines that the initial value of the third demodulation reference sequence satisfies:

$$c_{init} = (2^{17}(N_{symb}^{slot} n_{s,f}^m + l + 1) + i) \bmod(2^{31}),$$

where
$c_{init}$ is the initial value of the third demodulation reference sequence, $N_{symb}^{slot}$ is the quantity of symbols included in the first slot, $n_{s,f}^m$ is the slot number of the first slot, l is the symbol number of the symbol that carries the third demodulation reference sequence and that is in the first slot, i is any one of the index of the frequency domain pattern, the index of the time domain pattern, or the index of the time-frequency pattern of the demodulation reference sequence of the data channel shown in Table 2 to Table 4, and an operator mod represents a modulo operation.

S802: The first terminal apparatus sends the fourth control channel and the data channel to a second terminal apparatus in the first slot. Correspondingly, the second terminal apparatus receives the fourth control channel and the data channel from the first terminal apparatus in the first slot.

The fourth control channel carries the third demodulation reference sequence and the fourth control information, and the third demodulation reference sequence is used to demodulate the fourth control channel.

For example, the first terminal apparatus and the second terminal apparatus may perform transmission of the fourth control channel and the data channel in a first slot of a sidelink. For details, refer to an existing implementation. Details are not described herein again.

S803: The second terminal apparatus demodulates the fourth control channel to obtain the fourth control information.

For example, the second terminal apparatus can blindly detect the third demodulation reference sequence at the same time when demodulating the fourth control channel to obtain the fourth control information. For details, refer to an existing implementation. Details are not described herein again.

S804: The second terminal apparatus determines the demodulation reference sequence configuration of the data channel based on the third demodulation reference sequence.

For example, the second terminal apparatus may determine, in a blind detection manner, the demodulation reference sequence configuration of the data channel based on the third demodulation reference sequence. Detailed descriptions are provided below.

In a possible design method, that the second terminal apparatus determines the demodulation reference sequence configuration of the data channel based on the third demodulation reference sequence in S804 may include the following steps:

The second terminal apparatus determines the initial value of the third demodulation reference sequence. Then, the second terminal apparatus determines the demodulation reference sequence configuration of the data channel based on the initial value of the third demodulation reference sequence.

Optionally, that the second terminal apparatus determines the initial value of the third demodulation reference sequence may include: The second terminal apparatus determines a third candidate initial value set based on a candidate demodulation reference sequence configuration set, and generates a third candidate demodulation reference sequence set based on the third candidate initial value set. The candidate demodulation reference sequence configuration set includes one or more candidate demodulation reference sequence configurations of the data channel, the third candidate initial value set includes one or more candidate initial values of the third demodulation reference sequence, and the third candidate demodulation reference sequence set includes one or more candidate demodulation reference sequences of the third demodulation reference sequence. Then, the second terminal apparatus performs demodulation and decoding on the fourth control channel by using each candidate demodulation reference sequence in the third candidate demodulation reference sequence set, determines, as the third demodulation reference sequence, a candidate demodulation reference sequence that is in the third candidate demodulation reference sequence set and that can be used to successfully perform demodulation and decoding on the fourth control channel to obtain fourth control information, and determines a candidate initial value corresponding to the third demodulation reference sequence as the initial value of the third demodulation reference sequence.

Optionally, that the second terminal apparatus determines the demodulation reference sequence configuration of the data channel based on the initial value of the third demodulation reference sequence may include: The second terminal apparatus determines the demodulation reference sequence configuration of the data channel based on the initial value of the third demodulation reference sequence, a quantity of symbols included in a first slot, a slot number of the first slot, and a symbol number of a symbol that carries the third demodulation reference sequence and that is in the first slot.

For example, the demodulation reference sequence configuration of the data channel includes any one of the following: a frequency domain pattern, a time domain pattern, or a time-frequency pattern of a demodulation reference sequence of the data channel. The frequency domain pattern of the demodulation reference sequence of the data channel is in a one-to-one correspondence with an index of the frequency domain pattern of the demodulation reference sequence of the data channel. The time domain pattern of the demodulation reference sequence of the data channel is in a one-to-one correspondence with an index of the time domain pattern of the demodulation reference sequence of the data channel. The time-frequency pattern of the demodulation reference sequence of the data channel is in a one-to-one correspondence with an index of the time-frequency pattern of the demodulation reference sequence of the data channel.

Optionally, that the second terminal apparatus determines the demodulation reference sequence configuration of the data channel based on the initial value of the third demodulation reference sequence, a quantity of symbols included in the first slot, a slot number of the first slot, and a symbol number of a symbol that carries the third demodulation reference sequence and that is in the first slot may include:

The second terminal apparatus determines any one of the index of the frequency domain pattern, the index of the time domain pattern, or the index of the time-frequency pattern of the demodulation reference sequence of the data channel:

$$c_{init}=(2^{17}(N_{symb}^{slot}n_{s,f}^{m}+l+1)+i) \bmod (2^{31}), \text{ where}$$

$c_{init}$ is the initial value of the third demodulation reference sequence, $N_{symb}^{slot}$ is the quantity of symbols included in the first slot, $n_{s,f}^{m}$ is the slot number of the first slot, l is the symbol number of the symbol that carries the third demodulation reference sequence and that is in the first slot, i is any one of the index of the frequency domain pattern, the index of the time domain pattern, or the index of the time-frequency pattern of the demodulation reference sequence of the data channel, and an operator mod represents a modulo operation.

S805: The second terminal apparatus demodulates the data channel based on the fourth control information and the demodulation reference sequence configuration of the data channel.

For example, the second terminal apparatus may determine the demodulation reference sequence configuration of the data channel based on the blindly detected third demodulation reference sequence and a correspondence between a third demodulation reference sequence locally preconfigured in the second terminal apparatus and the any one of the index of the frequency domain pattern, the index of the time domain pattern, or the index of the time-frequency pattern of the demodulation reference sequence of the data channel, so as to demodulate the data channel based on the demodulation reference sequence configuration of the data channel and the fourth control information, to obtain the user data. For details, refer to an existing implementation. Details are not described herein again.

According to the communication method shown in FIG. 8, the first terminal apparatus can generate, based on the demodulation reference sequence configuration of the data channel, the third demodulation reference sequence used to demodulate the fourth control channel, that is, can implicitly transmit the demodulation reference sequence configuration of the data channel. When detecting the third demodulation reference sequence, the second terminal apparatus can simultaneously learn of the demodulation reference sequence configuration of the data channel. The first terminal apparatus does not need to separately send indication information such as the demodulation reference sequence configuration of the data channel to the second terminal apparatus. In this way, a quantity of pieces of indication information that needs to be transmitted and a quantity of resources occupied by the indication information can be reduced, thereby improving communication efficiency.

It should be noted that, in this embodiment of this application, "receiving a control channel" refers to an entire process of receiving an air interface signal corresponding to the control channel, blindly detecting a demodulation reference sequence of the control channel, and successfully performing demodulation and decoding on the control channel, to obtain control information carried on the control channel. The control information is used to receive a data channel associated with the control channel. In addition, "receiving a data channel" refers to an entire process of receiving an air interface signal corresponding to the data channel, performing channel estimation on the data channel, and then performing demodulation and decoding on the data channel based on a channel estimation result, to obtain user data carried on the data channel.

The communication methods provided in embodiments of this application are described above in detail with reference to FIG. 3 to FIG. 14. The following describes in detail communication apparatuses provided in embodiments of this application with reference to FIG. 15 and FIG. 16.

Figure 15:
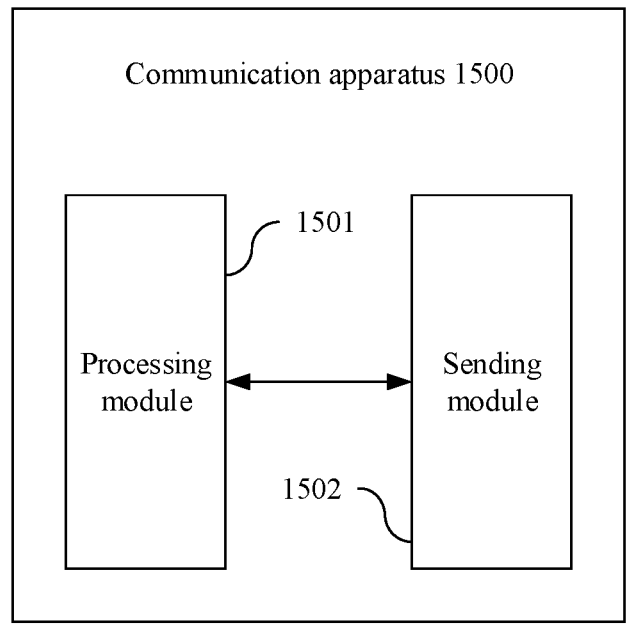
FIG. 15 is a second schematic diagram of a structure of a communication apparatus according to an embodiment of this application.

FIG. 15 is a second schematic diagram of a structure of a communication apparatus according to an embodiment of this application. The communication apparatus is applicable to the communication system shown in FIG. 1, performs a function of the first terminal apparatus in the communication method shown in FIG. 3. For ease of description, FIG. 15 shows only main components of the communication apparatus.

As shown in FIG. 15, the communication apparatus 1500 includes a processing module 1501 and a sending module 1502.

The processing module 1501 is configured to generate a first demodulation reference sequence based on an aggregation level of a second control channel. The first demodulation reference sequence is used to demodulate a first control channel, a first demodulation reference signal generated based on the first demodulation reference sequence is mapped to the first control channel, and first control information carried on the first control channel and second control information carried on the second control channel are used to demodulate a data channel. The sending module 1502 is configured to send the first control channel, the second control channel, and the data channel to a second terminal apparatus in a first slot.

In a possible design, the processing module 1501 is further configured to determine an initial value of the first demodulation reference sequence based on the aggregation level of the second control channel. The processing module 1501 is further configured to generate the first demodulation reference sequence based on the initial value of the first demodulation reference sequence.

Optionally, the processing module 1501 is further configured to determine the initial value of the first demodulation reference sequence based on the aggregation level of the second control channel, a quantity of symbols included in the first slot, a slot number of the first slot, and a symbol number of a symbol that carries the first demodulation reference sequence and that is in the first slot.

For example, the aggregation level of the second control channel is in a one-to-one correspondence with an index value of the aggregation level of the second control channel.

Optionally, the processing module 1501 is further configured to determine that the initial value of the first demodulation reference sequence satisfies:

$$c_{init} = (2^{17}(N_{symb}^{slot}n_{s,f}^m + l + 1) + k)\mod(2^{31}),$$

where $c_{init}$ is the initial value of the first demodulation reference sequence, $N_{symb}^{slot}$ is the quantity of symbols included in the first slot, $n_{s,f}^m$ is the slot number of the first slot, l is the symbol number of the symbol that carries the first demodulation reference sequence and that is in the first slot, k is the aggregation level of the second control channel, and an operator mod represents a modulo operation.

Optionally, the processing module 1501 is further configured to determine that the initial value of the first demodulation reference sequence satisfies:

$$c_{init} = (2^{17}(N_{symb}^{slot}n_{s,f}^m + l + 1) + i)\mod(2^{31}), \text{ where}$$

$c_{init}$ is the initial value of the first demodulation reference sequence, $N_{symb}^{slot}$ is the quantity of symbols included in the first slot, $n_{s,f}^m$ is the slot number of the first slot, l is the symbol number of the symbol that carries the first demodulation reference sequence and that is in the first slot, i is the index value of the aggregation level of the second control channel, and an operator mod represents a modulo operation.

The communication apparatus shown in FIG. 15 may alternatively be configured to perform a function of the first terminal apparatus in the communication method shown in FIG. 6. Details are described below.

The processing module 1501 is configured to generate a second demodulation reference sequence based on an aggregation level of a third control channel. The second demodulation reference sequence is used to demodulate the third control channel, a second demodulation reference signal generated based on the second demodulation reference sequence is mapped to the third control channel, and third control information is used to demodulate a data channel.

The sending module 1502 is configured to send the third control channel and the data channel to a second terminal apparatus in a first slot. The third control channel carries the third control information.

In a possible design, the processing module 1501 is further configured to determine an initial value of the second demodulation reference sequence based on the aggregation level of the third control channel. The processing module 1501 is further configured to generate the second demodulation reference sequence based on the initial value of the second demodulation reference sequence.

Optionally, the processing module 1501 is further configured to determine the initial value of the second demodulation reference sequence based on the aggregation level of the third control channel, a quantity of symbols included in a first slot, a slot number of the first slot, and a symbol number of a symbol that carries the second demodulation reference sequence and that is in the first slot.

For example, the aggregation level of the third control channel is in a one-to-one correspondence with an index value of the aggregation level of the third control channel.

Optionally, the processing module 1501 is further configured to determine that the initial value of the second demodulation reference sequence satisfies:

$$c_{init} = (2^{17}(N_{symb}^{slot}n_{s,f}^m + l + 1) + k)\mod(2^{31}),$$

where $c_{init}$ is the initial value of the second demodulation reference sequence, $N_{symb}^{slot}$ is the quantity of symbols included in the first slot, $n_{s,f}^m$ is the slot number of the first slot, l is the symbol number of the symbol that carries the second demodulation reference sequence and that is in the first slot, k is the aggregation level of the third control channel, and an operator mod represents a modulo operation.

Optionally, the processing module 1501 is further configured to determine that the initial value of the second demodulation reference sequence satisfies:

$$c_{init} = (2^{17}(N_{symb}^{slot}n_{s,f}^{m} + l + 1) + i) \bmod(2^{31}),$$

where
- $c_{init}$ is the initial value of the second demodulation reference sequence, $N_{symb}^{slot}$ is the quantity of symbols included in the first slot, $n_{s,f}^{m}$ is the slot number of the first slot, l is the symbol number of the symbol that carries the second demodulation reference sequence and that is in the first slot, i is the index value of the aggregation level of the third control channel, and an operator mod represents a modulo operation.

It should be noted that, in addition to the aggregation level of the third control channel, the second demodulation reference sequence may further implicitly indicate another parameter, for example, a control information format. Therefore, optionally, the processing module 1501 is further configured to calculate the initial value of the second demodulation reference sequence based on an index value of the control information format of the third control channel, for example, perform the calculation by substituting the index value of the control information format of the third control channel into the foregoing calculation formula of the initial value of the second demodulation reference sequence, to generate the second demodulation reference sequence, map the second demodulation reference sequence onto the third control channel, and control the sending module 1502 to send the third control channel. In this way, implicit transmission of the control information format of the third control channel is performed. The control information format of the third control channel is in a one-to-one correspondence with the index value of the control information format of the third control channel.

The communication apparatus shown in FIG. 15 may alternatively be configured to perform a function of the first terminal apparatus in the communication method shown in FIG. 8. Details are described below.

The processing module 1501 is configured to generate a third demodulation reference sequence based on a demodulation reference sequence configuration of a data channel, where the third demodulation reference sequence is used to demodulate a fourth control channel, and fourth control information carried on the fourth control channel is used to demodulate the data channel. The sending module 1502 is further configured to send the fourth control channel and the data channel to a second terminal apparatus in a first slot.

In a possible design, the processing module 1501 is further configured to determine an initial value of the third demodulation reference sequence based on the demodulation reference sequence configuration of the data channel. The processing module 1501 is further configured to generate the third demodulation reference sequence based on the initial value of the third demodulation reference sequence.

Optionally, the processing module 1501 is further configured to determine the initial value of the third demodulation reference sequence based on the demodulation reference sequence configuration of the data channel, a quantity of symbols included in the first slot, a slot number of the first slot, and a symbol number of a symbol that carries the third demodulation reference sequence and that is in the first slot.

For example, the demodulation reference sequence configuration of the data channel includes any one of the following: a frequency domain pattern, a time domain pattern, or a time-frequency pattern of a demodulation reference sequence of the data channel. The frequency domain pattern of the demodulation reference sequence of the data channel is in a one-to-one correspondence with an index of the frequency domain pattern of the demodulation reference sequence of the data channel. The time domain pattern of the demodulation reference sequence of the data channel is in a one-to-one correspondence with an index of the time domain pattern of the demodulation reference sequence of the data channel. The time-frequency pattern of the demodulation reference sequence of the data channel is in a one-to-one correspondence with an index of the time-frequency pattern of the demodulation reference sequence of the data channel.

Optionally, the processing module 1501 is further configured to determine that the initial value of the third demodulation reference sequence satisfies:

$$c_{init} = (2^{17}(N_{symb}^{slot}n_{s,f}^{m} + l + 1) + i) \bmod(2^{31}), \text{ where}$$

- $c_{init}$ is the initial value of the third demodulation reference sequence, $N_{symb}^{slot}$ is the quantity of symbols included in the first slot, $n_{s,f}^{m}$ is the slot number of the first slot, l is the symbol number of the symbol that carries the third demodulation reference sequence and that is in the first slot, i is any one of the index of the frequency domain pattern, the index of the time domain pattern, or the index of the time-frequency pattern of the demodulation reference sequence of the data channel, and an operator mod represents a modulo operation.

Optionally, the communication apparatus 1500 shown in FIG. 15 may further include a storage module (not shown in FIG. 15), and the storage module stores a program or instructions. When the processing module 1501 executes the program or the instructions, the communication apparatus 1500 may perform a function of the first terminal apparatus in the foregoing method embodiments.

Optionally, the communication apparatus 1500 shown in FIG. 15 may further include a receiving module (not shown in FIG. 15), so that the communication apparatus 1500 can also receive a signal sent by another communication apparatus, for example, the second terminal apparatus in FIG. 1, to implement bidirectional communications.

It should be noted that the communication apparatus 1500 may be the first terminal apparatus shown in FIG. 1 or the communication apparatus 200 shown in FIG. 2, or may be a chip or a chip system disposed in the foregoing device or apparatus. This is not limited in this embodiment of this application.

For technical effects of the communication apparatus 1500, refer to the foregoing method embodiments respectively. Details are not described herein again.

Figure 16:
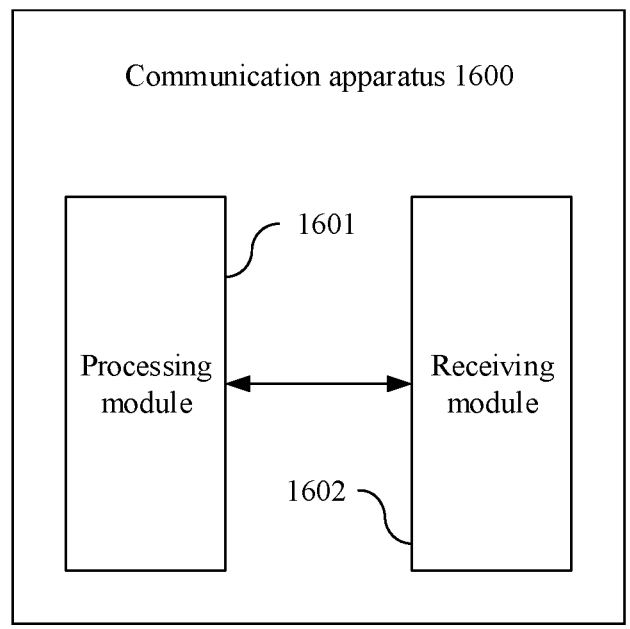
FIG. 16 is a third schematic diagram of a structure of a communication apparatus according to an embodiment of this application.

FIG. 16 is still another schematic diagram of a structure of a communication apparatus according to an embodiment of this application. The communication apparatus is applicable to the communication system shown in FIG. 1, performs a function of the second terminal apparatus in the communication method shown in FIG. 3. For ease of description, FIG. 16 shows only main components of the communication apparatus.

As shown in FIG. 16, the communication apparatus 1600 includes a processing module 1601 and a receiving module 1602.

The receiving module 1602 is configured to receive a first control channel from a first terminal apparatus in a first slot. The first control channel carries a first demodulation reference sequence and first control information, and the first demodulation reference sequence for generating a first demodulation reference signal is used to demodulate the first control channel. The processing module 1601 is configured to determine an aggregation level of a second control channel based on the first demodulation reference sequence. The processing module 1601 is further configured to receive the second control channel from the first terminal apparatus in the first slot based on the aggregation level of the second control channel. The first control information carried on the first control channel and the second control information carried on the second control channel are used to demodulate the data channel. The receiving module 1602 is further configured to receive the data channel from the first terminal apparatus in the first slot based on the first control information and the second control information.

In a possible design, the processing module 1601 is further configured to determine an initial value of the first demodulation reference sequence. The processing module 1601 is further configured to determine the aggregation level of the second control channel based on the initial value of the first demodulation reference sequence.

Optionally, the processing module 1601 is further configured to determine a first candidate initial value set based on a first candidate aggregation level set. The first candidate aggregation level set includes one or more candidate aggregation levels of the second control channel, and the first candidate initial value set includes one or more candidate initial values of the first demodulation reference sequence. The processing module 1601 is further configured to generate a first candidate demodulation reference sequence set based on the first candidate initial value set. The first candidate demodulation reference sequence set includes one or more candidate demodulation reference sequences of the first demodulation reference sequence. The processing module 1601 is further configured to perform demodulation and decoding on the first control channel by using each candidate demodulation reference sequence in the first candidate demodulation reference sequence set. The processing module 1601 is further configured to: determine, as the first demodulation reference sequence, a candidate demodulation reference sequence that is in the first candidate demodulation reference sequence set and that can be used to successfully perform demodulation and decoding on the first control channel to obtain first control information, and determine a candidate initial value corresponding to the first demodulation reference sequence as the initial value of the first demodulation reference sequence.

Optionally, the processing module 1601 is further configured to determine the aggregation level of the second control channel based on the initial value of the first demodulation reference sequence, a quantity of symbols included in the first slot, a slot number of the first slot, and a symbol number of a symbol that carries the first demodulation reference sequence and that is in the first slot.

For example, the aggregation level of the second control channel is in a one-to-one correspondence with an index value of the aggregation level of the second control channel.

Optionally, the processing module 1601 is further configured to determine that the aggregation level of the second control channel satisfies:

$$c_{init}=(2^{17}(N_{symb}^{slot}n_{s,f}^{m}+l+1)+k) \bmod(2^{31}), \text{ where}$$

$c_{init}$ is the initial value of the first demodulation reference sequence, $N_{symb}^{slot}$ is the quantity of symbols included in the first slot, $n_{s,f}^{m}$ is the slot number of the first slot, l is the symbol number of the symbol that carries the first demodulation reference sequence and that is in the first slot, k is the aggregation level of the second control channel, and an operator mod represents a modulo operation.

Optionally, the processing module 1601 is further configured to determine that the index value of the aggregation level of the second control channel satisfies:

$$c_{init}=(2^{17}(N_{symb}^{slot}n_{s,f}^{m}+l+1)+i) \bmod(2^{31}), \text{ where}$$

$c_{init}$ is the initial value of the first demodulation reference sequence, $N_{symb}^{slot}$ b is the quantity of symbols included in the first slot, $n_{s,f}^{m}$ is the slot number of the first slot, l is the symbol number of the symbol that carries the first demodulation reference sequence and that is in the first slot, i is the index value of the aggregation level of the second control channel, and an operator mod represents a modulo operation.

The communication apparatus shown in FIG. 16 may alternatively be configured to perform a function of the second terminal apparatus in the communication method shown in FIG. 6. Details are described below.

The receiving module 1602 is configured to receive, from a first terminal apparatus in a first slot, a second demodulation reference signal corresponding to a third control channel. The second demodulation reference sequence for generating the second demodulation reference signal is used to demodulate third control information carried on the third control channel.

The processing module 1601 is configured to determine an aggregation level of the third control channel based on the second demodulation reference sequence.

The processing module 1601 is further configured to receive the third control information from the first terminal apparatus based on the aggregation level of the third control channel. The third control information carried on the third control channel is used to demodulate a data channel.

The receiving module 1602 is further configured to receive the data channel from the first terminal apparatus in the first slot based on the third control information.

In a possible design, the processing module 1601 is further configured to determine an initial value of the second demodulation reference sequence. The processing module 1601 is further configured to determine the aggregation level of the third control channel based on the initial value of the second demodulation reference sequence.

Optionally, the processing module 1601 is further configured to determine a second candidate initial value set based on a second candidate aggregation level set. The second candidate aggregation level set includes one or more candidate aggregation levels of the third control channel, and the second candidate initial value set includes one or more candidate initial values of the second demodulation reference sequence.

The processing module 1601 is further configured to generate a second candidate demodulation reference sequence set based on the second candidate initial value set. The second candidate demodulation reference sequence set includes one or more candidate demodulation reference sequences of the second demodulation reference sequence.

The processing module 1601 is further configured to perform correlation detection on a received signal of the third control channel by using each candidate demodulation reference sequence in the second candidate demodulation reference sequence set.

The processing module 1601 is further configured to: determine a candidate demodulation reference sequence with a largest average correlation value in the second candidate demodulation reference sequence set as the second demodulation reference sequence, and determine a candidate initial value corresponding to the second demodulation reference sequence as the initial value of the second demodulation reference sequence.

In a possible implementation, the processing module 1601 is further configured to calculate an average correlation value corresponding to each candidate demodulation reference sequence in the second candidate demodulation reference sequence set:

$$c = \frac{1}{N}\sum_{n=0}^{N-1} \|h_n^* h_{n,k}\|^2,$$

where
- c is an average correlation value of a first candidate demodulation reference sequence, the first candidate demodulation reference sequence is any candidate demodulation reference sequence in the second candidate demodulation reference sequence set, $h_n$ is the received signal of the third control channel, $h_{n,k}$ is the first candidate demodulation reference sequence, k is a candidate aggregation level corresponding to the first candidate demodulation reference sequence in the second candidate aggregation level set, $h_{n,k}$ is a conjugate complex number of $h_n$, 0≤n<N−1, and N is a sequence length of $h_{n,k}$.

In another possible implementation, the processing module 1601 is further configured to calculate an average correlation value corresponding to each candidate demodulation reference sequence in the second candidate demodulation reference sequence set:

$$c = \frac{1}{N}\sum_{n=0}^{N-1} \|h_n^* h_{n,i}\|^2,$$

where
- c is an average correlation value of a first candidate demodulation reference sequence, the first candidate demodulation reference sequence is any candidate demodulation reference sequence in the second candidate demodulation reference sequence set, $h_n$ is the received signal of the third control channel, $h_{n,i}$ is the first candidate demodulation reference sequence, i is an index value of the candidate aggregation level corresponding to the first candidate demodulation reference sequence in the second candidate aggregation level set, $h_{n,i}$ is a conjugate complex number of $h_n$, 0≤n<N−1, and N is a sequence length of $h_{n,i}$.

For example, the average correlation value includes a first average correlation value and a second average correlation value. The first average correlation value is an average correlation value on a first resource scheduling unit, the second average correlation value is an average correlation value on a second resource scheduling unit, and the first resource scheduling unit and the second resource scheduling unit are consecutive in frequency domain. Optionally, the processing module 1601 is further configured to: if a ratio of the first average correlation value to the second average correlation value is greater than a first ratio threshold and less than a second ratio threshold, determine that correlation of the first resource scheduling unit is consistent with correlation of the second resource scheduling unit.

Optionally, the processing module 1601 is further configured to determine the aggregation level of the third control channel based on the initial value of the second demodulation reference sequence, a quantity of symbols included in the first slot, a slot number of the first slot, and a symbol number of a symbol that carries the second demodulation reference sequence and that is in the first slot.

For example, the aggregation level of the third control channel is in a one-to-one correspondence with an index value of the aggregation level of the third control channel.

Optionally, the processing module 1601 is further configured to determine that the aggregation level of the third control channel satisfies:

$$c_{init} = (2^{17}(N_{symb}^{slot} n_{s,f}^m + l + 1) + k) mod(2^{31}),$$

where
- $c_{init}$ is the initial value of the second demodulation reference sequence, $N_{symb}^{slot}$ is the quantity of symbols included in the first slot, $n_{s,f}^m$ is the slot number of the first slot, l is the symbol number of the symbol that carries the second demodulation reference sequence and that is in the first slot, k is the aggregation level of the third control channel, and an operator mod represents a modulo operation.

Optionally, the processing module 1601 is further configured to determine that the index value of the aggregation level of the third control channel satisfies:

$$c_{init} = (2^{17}(N_{symb}^{slot} n_{s,f}^m + l + 1) + i) mod(2^{31}),$$

where
- $c_{init}$ is the initial value of the second demodulation reference sequence, $N_{symb}^{slot}$ is the quantity of symbols included in the first slot, $n_{s,f}^m$ is the slot number of the first slot, l is the symbol number of the symbol that carries the second demodulation reference sequence and that is in the first slot, i is the index value of the aggregation level of the third control channel, and an operator mod represents a modulo operation.

It should be noted that, in addition to the aggregation level of the third control channel, the second demodulation reference sequence may further indicate another parameter, for example, a control information format. Different control information formats respectively correspond to different services. Therefore, optionally, the processing module 1601 is further configured to determine the second demodulation reference sequence and the initial value of the second demodulation reference sequence based on a blind detection result of the demodulation reference sequence, to determine an index value of the control information format of the third control channel corresponding to the second demodulation reference sequence, and further obtain the control information format of the third control channel. In this way, implicit transmission of the control information format of the third control channel is performed. The control information format of the third control channel is in a one-to-one correspondence with the index value of the control information format of the third control channel.

The communication apparatus shown in FIG. 16 may alternatively be configured to perform a function of the second terminal apparatus in the communication method shown in FIG. 8. Details are described below.

The receiving module 1602 is configured to receive a fourth control channel and a data channel from a first terminal apparatus in a first slot. The fourth control channel carries a third demodulation reference sequence and fourth control information, and the third demodulation reference sequence is used to demodulate the fourth control channel.

The processing module 1601 is further configured to demodulate the fourth control channel, to obtain the fourth control information.

The processing module 1601 is further configured to determine a demodulation reference sequence configuration of the data channel based on the third demodulation reference sequence.

The processing module 1601 is further configured to demodulate the data channel based on the fourth control information and the demodulation reference sequence configuration of the data channel.

In a possible design, the processing module 1601 is further configured to: determine an initial value of the third demodulation reference sequence, and determine the demodulation reference sequence configuration of the data channel based on the initial value of the third demodulation reference sequence.

Optionally, the processing module 1601 is further configured to determine a third candidate initial value set based on a candidate demodulation reference sequence configuration set. The candidate demodulation reference sequence configuration set includes one or more candidate demodulation reference sequence configurations of the data channel, and the third candidate initial value set includes one or more candidate initial values of the third demodulation reference sequence. The processing module 1601 is further configured to generate a third candidate demodulation reference sequence set based on the third candidate initial value set. The third candidate demodulation reference sequence set includes one or more candidate demodulation reference sequences of the third demodulation reference sequence. The processing module 1601 is further configured to perform demodulation and decoding on the fourth control channel by using each candidate demodulation reference sequence in the third candidate demodulation reference sequence set. The processing module 1601 is further configured to: determine, as the third demodulation reference sequence, a candidate demodulation reference sequence that is in the third candidate demodulation reference sequence set and that can be used to successfully perform demodulation and decoding on the fourth control channel to obtain fourth control information, and determine a candidate initial value corresponding to the third demodulation reference sequence as the initial value of the third demodulation reference sequence.

Optionally, the processing module 1601 is further configured to determine the demodulation reference sequence configuration of the data channel based on the initial value of the third demodulation reference sequence, a quantity of symbols included in the first slot, a slot number of the first slot, and a symbol number of a symbol that carries the third demodulation reference sequence and that is in the first slot.

For example, the demodulation reference sequence configuration of the data channel includes any one of the following: a frequency domain pattern, a time domain pattern, or a time-frequency pattern of a demodulation reference sequence of the data channel. The frequency domain pattern of the demodulation reference sequence of the data channel is in a one-to-one correspondence with an index of the frequency domain pattern of the demodulation reference sequence of the data channel. The time domain pattern of the demodulation reference sequence of the data channel is in a one-to-one correspondence with an index of the time domain pattern of the demodulation reference sequence of the data channel. The time-frequency pattern of the demodulation reference sequence of the data channel is in a one-to-one correspondence with an index of the time-frequency pattern of the demodulation reference sequence of the data channel.

Optionally, the processing module 1601 is further configured to determine any one of the index of the frequency domain pattern, the index of the time domain pattern, or the index of the time-frequency pattern of the demodulation reference sequence of the data channel according to the following formula:

$$c_{init} = (2^{17}(N_{symb}^{slot} n_{s,f}^{m} + l + 1) + i) mod(2^{31}),$$

where $c_{init}$ is the initial value of the third demodulation reference sequence, $N_{symb}^{slot}$ is the quantity of symbols included in the first slot, $n_{s,f}^{m}$ is the slot number of the first slot, l is the symbol number of the symbol that carries the third demodulation reference sequence and that is in the first slot, i is any one of the index of the frequency domain pattern, the index of the time domain pattern, or the index of the time-frequency pattern of the demodulation reference sequence of the data channel, and an operator mod represents a modulo operation.

Optionally, the communication apparatus 1600 shown in FIG. 16 may further include a storage module (not shown in FIG. 16), and the storage module stores a program or instructions. When the processing module 1601 executes the program or the instructions, the communication apparatus 1600 may perform a function of the second terminal apparatus in the foregoing method embodiments.

Optionally, the communication apparatus 1600 shown in FIG. 16 may further include a sending module (not shown in FIG. 16), so that the communication apparatus 1600 sends a signal to another communication apparatus, for example, the second terminal apparatus in FIG. 1, to implement bidirectional communications.

It should be noted that the communication apparatus 1600 may be the second terminal apparatus shown in FIG. 1 or the communication apparatus 200 shown in FIG. 2, or may be a chip or a chip system disposed in the foregoing device or apparatus. This is not limited in this embodiment of this application.

For technical effects of the communication apparatus 1600, refer to the foregoing method embodiments respectively. Details are not described herein again.

It should be noted that the communication apparatus 1500 may also perform a function of the second terminal apparatus. Similarly, the communication apparatus 1600 may also perform a function of the first terminal apparatus. This is not limited in embodiments of this application.

The communication apparatus may be a terminal, or may be a chip or a chip system used in a terminal, or another combined device, another combined part, or the like that has a function of the terminal.

When the communication apparatus is a terminal, the receiving module may be a receiver, and may include an antenna, a radio frequency circuit, and the like; the processing module may be a processor, for example, a central processing unit (central processing unit, CPU); the sending module may be a transmitter, and may include an antenna, a radio frequency circuit, and the like; and the receiver and the transmitter may be an integrated transceiver.

When the communication apparatus is a part that has a function of the terminal, the receiving module may be a radio frequency unit, the processing module may be a processor, and the sending module may be a radio frequency unit.

When the communication apparatus is a chip or a chip system, the receiving module may be an input interface of the chip system, the processing module may be a processor of the chip system, and the sending module may be an output interface of the chip system.

An embodiment of this application provides a communication system. The system includes the first terminal apparatus and one or more second terminal apparatuses.

An embodiment of this application provides a computer-readable storage medium. The computer-readable storage medium stores computer instructions. When the computer instructions are run on a computer, the computer is enabled to perform a communication method according to the foregoing method embodiments.

An embodiment of this application provides a computer program product including instructions. The computer program product includes a computer program or the instructions. When the computer program or instructions are run on a computer, the computer is enabled to perform a communication method according to the foregoing method embodiments.

It should be understood that, the processor in embodiments of this application may be a central processing unit (CPU), or may be another general purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor, or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by software, hardware (for example, a circuit), firmware, or any combination thereof. When the software is used to implement embodiments, all or some of the foregoing embodiments may be implemented in a form of a computer program product. The computer program product includes one or more computer instructions or computer programs. When the computer instructions or the computer programs are loaded or executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists, where A and B may be singular or plural. In addition, the character "/" in this specification usually represents an "or" relationship between the associated objects, or may represent an "and/or" relationship. For details, refer to foregoing and following descriptions for understanding.

In this application, "at least one" means one or more, and "a plurality of" means two or more. "At least one (one piece) of the following" or a similar expression thereof means "any combination of the following", including "any combination of one or more of the following". For example, at least one (one piece) of a, b, or c may represent: a, b, c, a and b, a and c, b and c, or a, b, and c, where a, b, and c may be singular or plural.

It should be understood that sequence numbers of the foregoing processes do not mean execution sequences in various embodiments of this application. Execution sequences of the processes should be determined based on functions and internal logic of the processes, and should not be construed as any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the apparatus embodiments described in the foregoing are only examples. For example, division of the units is only a type of division of logical functions, and may be another manner of division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in an electronic, a mechanical, or another form.

The units described as separate parts may or may not be physically separate, and parts displayed as units may or may not be physical units, may be located in one position, or may be distributed on a plurality of network units. Some or all of the units may be selected based on actual requirements to implement embodiments.

In addition, function units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application may fall within the protection scope of this application.

What is claimed is:

1. A communication method, comprising:
   generating, by a first terminal apparatus, a first demodulation reference sequence based on an aggregation level of a second control channel, wherein the first demodulation reference sequence is for demodulating a first control channel, wherein a first demodulation reference signal generated based on the first demodulation reference sequence is mapped to the first control channel, and wherein first control information carried on the first control channel and second control information carried on the second control channel are for demodulating a data channel; and
   sending, by the first terminal apparatus, the first control channel, the second control channel, and the data channel to a second terminal apparatus in a first slot.

2. The communication method according to claim 1, wherein generating the first demodulation reference sequence based on aggregation level of the second control channel comprises:
   determining, by the first terminal apparatus, an initial value of the first demodulation reference sequence based on the aggregation level of the second control channel; and
   generating, by the first terminal apparatus, the first demodulation reference sequence based on the initial value of the first demodulation reference sequence.

3. The communication method according to claim 2, wherein determining the initial value of the first demodulation reference sequence based on the aggregation level of the second control channel comprises:
   determining, by the first terminal apparatus, a quantity of symbols of the first slot, a slot number of the first slot, and a symbol number of a symbol that carries the first demodulation reference sequence and that is in the first slot.

4. The communication method according to claim 3, wherein determining the quantity of symbols of the first slot, the slot number of the first slot, and the symbol number of the symbol that carries the first demodulation reference sequence and that is in the first slot comprises:
   determining, by the first terminal apparatus, that the initial value of the first demodulation reference sequence satisfies:

$$c_{init}=(2^{17}(N_{symb}^{slot}n_{s,f}^{m}+l+1)+k)\bmod(2^{31}),$$

wherein $c_{init}$ is the initial value of the first demodulation reference sequence, $N_{symb}^{slot}$ is the quantity of symbols of the first slot, $n_{s,f}^{m}$ is the slot number of the first slot, l is the symbol number of the symbol that carries the first demodulation reference sequence and that is in the first slot, k is the aggregation level of the second control channel, and an operator mod represents a modulo operation.

5. The communication method according to claim 3, wherein determining the quantity of symbols of the first slot, the slot number of the first slot, and the symbol number of the symbol that carries the first demodulation reference sequence and that is in the first slot comprises:
   determining, by the first terminal apparatus, that the initial value of the first demodulation reference sequence satisfies:

$$c_{init}=(2^{17}(N_{symb}^{slot}n_{s,f}^{m}+l+1)+i)\bmod(2^{31}),$$

wherein $c_{init}$ is the initial value of the first demodulation reference sequence, $N_{symb}^{slot}$ is the quantity of symbols of the first slot, $n_{s,f}^{m}$ the slot number of the first slot, l is the symbol number of the symbol that carries the first demodulation reference sequence and that is in the first slot, i is an index value of the aggregation level of the second control channel, and an operator mod represents a modulo operation.

6. A communication method, comprising:
   receiving, by a second terminal apparatus, a first control channel from a first terminal apparatus in a first slot, wherein the first control channel carries a first demodulation reference signal and first control information, and wherein a first demodulation reference sequence for generating the first demodulation reference signal is for demodulating the first control channel;

determining, by the second terminal apparatus, an aggregation level of a second control channel based on the first demodulation reference sequence;

receiving, by the second terminal apparatus, the second control channel from the first terminal apparatus in the first slot based on the aggregation level of the second control channel, wherein the first control information carried on the first control channel and second control information carried on the second control channel are for demodulating a data channel; and receiving, by the second terminal apparatus, the data channel from the first terminal apparatus in the first slot based on the first control information and the second control information.

7. The communication method according to claim 6, wherein determining the aggregation level of the second control channel based on the first demodulation reference sequence comprises:

determining, by the second terminal apparatus, an initial value of the first demodulation reference sequence; and determining, by the second terminal apparatus, the aggregation level of the second control channel based on the initial value of the first demodulation reference sequence.

8. The communication method according to claim 7, wherein determining the aggregation level of the second control channel based on the initial value of the first demodulation reference sequence comprises:

determining, by the second terminal apparatus, a quantity of symbols of the first slot, a slot number of the first slot, and a symbol number of a symbol that carries the first demodulation reference sequence and that is in the first slot.

9. The communication method according to claim 8, wherein determining the quantity of symbols of the first slot, the slot number of the first slot, and the symbol number of the symbol that carries the first demodulation reference sequence and that is in the first slot comprises:

determining, by the second terminal apparatus, that the aggregation level of the second control channel satisfies:

$$c_{init}=(2^{17}(N_{symb}^{slot}n_{s,f}^{m}+l+1)+k)\bmod(2^{31}),$$

wherein $c_{init}$ is the initial value of the first demodulation reference sequence, $N_{symb}^{slot}$ is the quantity of symbols of the first slot, $n_{s,f}^{ms}$ the slot number of the first slot, l is the symbol number of the symbol that carries the first demodulation reference sequence and that is in the first slot, k is the aggregation level of the second control channel, and an operator mod represents a modulo operation.

10. The communication method according to claim 8, wherein determining the quantity of symbols of the first slot, the slot number of the first slot, and the symbol number of the symbol that carries the first demodulation reference sequence and that is in the first slot comprises:

determining, by the second terminal apparatus, that an index value of the aggregation level of the second control channel satisfies:

$$c_{init}=(2^{17}(N_{symb}^{slot}n_{s,f}^{m}+l+1)+i)\bmod(2^{31}),$$

wherein $c_{init}$ is the initial value of the first demodulation reference sequence, $N_{symb}^{slot}$ is the quantity of symbols of the first slot, $n_{s,f}^{ms}$ the slot number of the first slot, l is the symbol number of the symbol that carries the first demodulation reference sequence and that is in the first slot, i is the index value of the aggregation level of the second control channel, and an operator mod represents a modulo operation.

11. A communication apparatus, comprising:

a memory storage comprising instructions; and one or more processors in communication with the memory storage, wherein the execution of the instructions by the one or more processors causes the apparatus to:

generate a first demodulation reference sequence based on an aggregation level of a second control channel, wherein the first demodulation reference sequence is for demodulating a first control channel, wherein a first demodulation reference signal generated based on the first demodulation reference sequence is mapped to the first control channel, and wherein first control information carried on the first control channel and second control information carried on the second control channel are for demodulating a data channel; and send the first control channel, the second control channel, and the data channel to a second terminal apparatus in a first slot.

12. The communication apparatus according to claim 11, wherein the execution of the instructions by the one or more processors further causes the apparatus to:

determine an initial value of the first demodulation reference sequence based on the aggregation level of the second control channel; and generate the first demodulation reference sequence based on the initial value of the first demodulation reference sequence.

13. The communication apparatus according to claim 12, wherein the execution of the instructions by the one or more processors further causes the apparatus to:

determine a quantity of symbols of the first slot, a slot number of the first slot, and a symbol number of a symbol that carries the first demodulation reference sequence and that is in the first slot.

14. The communication apparatus according to claim 13, wherein the execution of the instructions by the one or more processors further causes the apparatus to:

determine that the initial value of the first demodulation reference sequence satisfies:

$$c_{init}=(2^{17}(N_{symb}^{slot}n_{s,f}^{m}+l+1)+k)\bmod(2^{31}),$$

wherein $c_{init}$ is the initial value of the first demodulation reference sequence, $N_{symb}^{slot}$ is the quantity of symbols of the first slot, $n_{s,f}^{m}$ the slot number of the first slot, l is the symbol number of the symbol that carries the first demodulation reference sequence and that is in the first slot, k is the aggregation level of the second control channel, and an operator mod represents a modulo operation.

15. The communication apparatus according to claim 13, wherein the execution of the instructions by the one or more processors further causes the apparatus to:

determine that the initial value of the first demodulation reference sequence satisfies:

$$c_{init}=(2^{17}(N_{symb}^{slot}n_{s,f}^{m}+l+1)+i)\bmod(2^{31}),$$

wherein $c_{init}$ is the initial value of the first demodulation reference sequence, $N_{symb}^{slot}$ is the quantity of symbols of the first slot, $n_{s,f}^{m}$ the slot number of the first slot, l is the symbol number of the symbol that carries the first demodulation reference sequence and that is in the first slot, i is an index value of the aggregation level of the second control channel, and an operator mod represents a modulo operation.

16. A communication apparatus, comprising:

a memory storage comprising instructions; and one or more processors in communication with the memory storage, wherein execution of the instructions by the one or more processors causes the apparatus to:

receive a first control channel from a first terminal apparatus in a first slot, wherein the first control channel carries a first demodulation reference signal and first control information, and wherein a first demodulation reference sequence for generating the first demodulation reference signal is for demodulating the first control channel;

determine an aggregation level of a second control channel based on the first demodulation reference sequence;

receive the second control channel from the first terminal apparatus in the first slot based on the aggregation level of the second control channel, wherein the first control information carried on the first control channel and second control information carried on the second control channel are for demodulating a data channel; and receive the data channel from the first terminal apparatus in the first slot based on the first control information and the second control information.

17. The communication apparatus according to claim 16, wherein the execution of the instructions by the one or more processors further causes the apparatus to:

determine an initial value of the first demodulation reference sequence; and determine the aggregation level of the second control channel based on the initial value of the first demodulation reference sequence.

18. The communication apparatus according to claim 17, wherein the execution of the instructions by the one or more processors further causes the apparatus to:

determine a quantity of symbols of the first slot, a slot number of the first slot, and a symbol number of a symbol that carries the first demodulation reference sequence and that is in the first slot.

19. The communication apparatus according to claim 17, wherein the execution of the instructions by the one or more processors further causes the apparatus to:

determine that the aggregation level of the second control channel satisfies:

$$c_{init}=(2^{17}(N_{symb}^{slot}n_{s,f}^{m}+l+1)+k)\mod(2^{31}),$$

wherein $c_{init}$ is the initial value of the first demodulation reference sequence, $N_{symb}^{slot}$ is the quantity of symbols of the first slot, $n_{s,f}^{m}$ is the slot number of the first slot, l is the symbol number of the symbol that carries the first demodulation reference sequence and that is in the first slot, k is the aggregation level of the second control channel, and an operator mod represents a modulo operation.

20. The communication apparatus according to claim 17, wherein the execution of the instructions by the one or more processors further causes the apparatus to:

determine that an index value of the aggregation level of the second control channel satisfies:

$$c_{init}=(2^{17}(N_{symb}^{slot}n_{s,f}^{m}+l+1)+i)\mod(2^{31}),$$

wherein $c_{init}$ is the initial value of the first demodulation reference sequence, $N_{symb}^{slot}$ is the quantity of symbols of the first slot, $n_{s,f}^{m}$ is the slot number of the first slot, l is the symbol number of the symbol that carries the first demodulation reference sequence and that is in the first slot, i is the index value of the aggregation level of the second control channel, and an operator mod represents a modulo operation.

* * * * *

UNITED STATES PATENT AND TRADEMARK OFFICE
CERTIFICATE OF CORRECTION

PATENT NO. : 11,996,944 B2
APPLICATION NO. : 17/514964
DATED : May 28, 2024
INVENTOR(S) : Wenting Guo et al.

It is certified that error appears in the above-identified patent and that said Letters Patent is hereby corrected as shown below:

In the Claims

Claim 2, Column 60, Line 6: reads as "sequence based on aggregation level of the second control" should read -- sequence based on the aggregation level of the second control --.

Claim 9, Column 61, Line 47: reads as "the first slot, $n_{s,f}^{ms}$ the slot number of the first slot, 1 is the" should read -- the first slot, $n_{s,f}^{m}$ is the slot number of the first slot, 1 is the --.

Claim 10, Column 61, Line 65: reads as "the first slot, $n_{s,f}^{ms}$ the slot number of the first slot, 1 is the" should read -- the first slot, $n_{s,f}^{m}$ is the slot number of the first slot, 1 is the --.

Claim 11, Column 62, Line 7: reads as "memory storage, wherein the execution of the instructions" should read -- memory storage, wherein execution of the instructions --.

Signed and Sealed this
Fifteenth Day of April, 2025

Coke Morgan Stewart
*Acting Director of the United States Patent and Trademark Office*